United States Patent
Nishijima

(10) Patent No.: US 9,207,751 B2
(45) Date of Patent: Dec. 8, 2015

(54) SEMICONDUCTOR DEVICE

(71) Applicant: Semiconductor Energy Laboratory Co., Ltd., Atsugi-shi, Kanagawa-ken (JP)

(72) Inventor: Tatsuji Nishijima, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/778,218

(22) Filed: Feb. 27, 2013

(65) Prior Publication Data

US 2013/0232365 A1    Sep. 5, 2013

(30) Foreign Application Priority Data

Mar. 1, 2012   (JP) ................. 2012-045194

(51) Int. Cl.
*G11C 5/14* (2006.01)
*G06F 1/32* (2006.01)

(52) U.S. Cl.
CPC ........... *G06F 1/3275* (2013.01); *Y02B 60/1228* (2013.01)

(58) Field of Classification Search
CPC .......... G11C 5/147; G11C 7/109; G11C 8/10; G11C 8/08
USPC ........... 365/227, 229, 154, 149, 185, 222, 51, 365/226, 72
See application file for complete search history.

(56) References Cited

U.S. PATENT DOCUMENTS

| | | | | |
|---|---|---|---|---|
| 5,465,249 A | * | 11/1995 | Cooper et al. | 365/149 |
| 5,663,905 A | * | 9/1997 | Matsuo et al. | 365/149 |
| 5,724,297 A | * | 3/1998 | Noda et al. | 365/226 |
| 5,731,856 A | | 3/1998 | Kim et al. | |
| 5,744,864 A | | 4/1998 | Cillessen et al. | |
| 5,901,103 A | * | 5/1999 | Harris et al. | 365/226 |
| 6,294,274 B1 | | 9/2001 | Kawazoe et al. | |

(Continued)

FOREIGN PATENT DOCUMENTS

| | | |
|---|---|---|
| EP | 1737044 A | 12/2006 |
| EP | 2226847 A | 9/2010 |

(Continued)

OTHER PUBLICATIONS

Spasov, Microcontroller Technology: The 68HC11, Prentice-Hall, Inc. 1993. section 1.3.3 The Central Processing Unit (CPU).*

(Continued)

*Primary Examiner* — Shawki S Ismail
*Assistant Examiner* — Muhammad S Islam
(74) *Attorney, Agent, or Firm* — Fish & Richardson P.C.

(57) ABSTRACT

The semiconductor device includes a CPU core having functions of a control unit, an arithmetic unit, and a register; a first memory device including a plurality of blocks each including one or a plurality of rows of memory cells; a second memory device copying data that is to be treated in the CPU core from a first block selected by the CPU core from the plurality of blocks included in the first memory device, and storing the data; a plurality of switches controlling supply of power supply voltage to the respective blocks; a memory management unit recognizing an address of the first block; and a power controller turning off one of the plurality of switches using the address to stop supply of the power supply voltage to a second block of the plurality of blocks which is different from the first block.

19 Claims, 14 Drawing Sheets

(56) References Cited

U.S. PATENT DOCUMENTS

| | | | |
|---|---|---|---|
| 6,563,174 B2 | 5/2003 | Kawasaki et al. | |
| 6,603,700 B2 * | 8/2003 | Aruga | 365/226 |
| 6,727,522 B1 | 4/2004 | Kawasaki et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,674,650 B2 | 3/2010 | Akimoto et al. | |
| 7,732,819 B2 | 6/2010 | Akimoto et al. | |
| 8,896,042 B2 | 11/2014 | Yamazaki et al. | |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0242550 A1 | 10/2007 | Lasser et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2010/0140709 A1 * | 6/2010 | Mouli | 257/349 |
| 2011/0089417 A1 | 4/2011 | Yamazaki et al. | |
| 2011/0089419 A1 * | 4/2011 | Yamazaki et al. | 257/43 |
| 2011/0101351 A1 | 5/2011 | Yamazaki | |
| 2011/0176357 A1 * | 7/2011 | Koyama et al. | 365/149 |
| 2012/0230078 A1 | 9/2012 | Fujita | |
| 2013/0191673 A1 | 7/2013 | Koyama et al. | |
| 2013/0215661 A1 | 8/2013 | Koyama | |
| 2013/0223135 A1 | 8/2013 | Koyama | |
| 2014/0167041 A1 | 6/2014 | Yamazaki et al. | |
| 2014/0326999 A1 | 11/2014 | Yamazaki et al. | |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2010-044460 A | 2/2010 |
| WO | WO-2004/114391 | 12/2004 |

OTHER PUBLICATIONS

Asakuma.N. et al., "Crystallization and Reduction of Sol-Gel-Derived Zinc Oxide Films by Irradation with Ultraviolet Lamp", Journal of Sol-Gel Science and Technology, 2003, vol. 26, pp. 181-184.

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.

Clark.S et al., "First Principles Methods Using CASTEP", Zeitschrift fur Kristallographie, 2005, vol. 220, pp. 567-570.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

(56) References Cited

OTHER PUBLICATIONS

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Fortunato.E et al., "Wide-Bandgap High-Mobility ZnO Thin-Film Transistors Produced at Room Temperature", Appl. Phys. Lett. (Applied Physics Letters), Sep. 27, 2004, vol. 85, No. 13, pp. 2541-2543.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphous In—Ga—Zn—Oxide TFT", SID International Symposium Digest of Technical Papers, May 31, 2009, pp. 1110-1112.

Godo.H et al., "Temperature Dependence of Characteristics and Electronic Structure and Electronic Structure for Amorphous In—Ga—Zn—Oxide TFT", AM-FPD '09 Digest of Technical Papers, Jul. 1, 2009, pp. 41-44.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Hirao.T et al., "Novel Top-Gate Zinc Oxide Thin-Film Transistors (ZnO TFTs) for AMLCDS", Journal of the SID, 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Ikeda.T et al., "Full-Functional System Liquid Crystal Display Using CG-Silicon Technology", SID Digest '04 : SID International Symposium Digest of Technical Papers, 2004, vol. 35. pp. 860-863.

Janotti.A et al., "Native Point Defects in ZnO", Phys. Rev. B (Physical Review. B), Oct. 4, 2007, vol. 76, No. 16, pp. 165202-1-165202-22.

Janotti.A et al., "Oxygen Vacancies in ZnO", Appl. Phys. Lett. (Applied Physics Letters) , 2005, vol. 87, pp. 122102-1-122102-3.

Jeong.J et al., "3.1: Distinguished Paper: 12.1-Inch WXGA AMOLED Display Driven by Indium—Gallium—Zinc Oxide TFT Array", SID Digest '08 : SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission AMOLED Display on Plastic and its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phase for Display Application", SID Digest '07 : SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N. et al., "Spinel,YBFE2O4, and YB2FE3O7 Types of Structures for Compounds in the in the In2O3 and Sc2O3—A2O3—BO Systems [A; Fe, Ga, or Al; B: Mg, Mn, Fe, Ni, Cu, or Zn] at Temeperatures over 1000° C.", Journal of Solid State Chemistry, 1985, vol. 60, pp. 382-384.

Kimizuka.N et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3—ZnGa2O4—ZnO System", Journal of Solid State Chemistry, Apr. 1, 1995, vol. 116, No. 1, pp. 170-178.

Kitzerow.H et al., "Observation of Blue Phases in Chiral Networks", Liquid Crystals, 1993, vol. 14, No. 3, pp. 911-916.

Kurokawa.Y et al., "UHF RFCPUS on Flexible and Glass Substrates for Secure RFID Systems", Journal of Solid State Circuits , 2008, vol. 43, No. 1, pp. 292-299.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Lee.H et al., "Current Status of, Challenges to, and Perspective View of AM-OLED ", IDW '06 : Proceedings of the 13th International Display Workshops, Dec. 7, 2006, pp. 663-666.

Lee.J et al., "World'S Largest (15-Inch) XGA AMLCD Panel Using IGZO Oxide TFT", SID Digest '08 : SID International Symposium Digest of Technical Papers, May 20, 2008, vol. 39, pp. 625-628.

Lee.M et al., "15.4:Excellent Performance of Indium—Oxide-Based Thin-Film Transistors by DC Sputtering", SID Digest '09 : SID International Symposium Digest of Technical Papers, May 31, 2009, pp. 191-193.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "Suftla Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size AMOLED Displays", IDW '08 : Proceedings of the 6th International Display Workshops, Dec. 3, 2008, pp. 581-584.

Nakamura.M et al., "The phase relations in the In2O3—Ga2ZnO4—ZnO system at 1350°C", Journal of Solid State Chemistry, Aug. 1, 1991, vol. 93, No. 2, pp. 298-315.

Nakamura.M, "Synthesis of Homologous Compound with New Long-Period Structure", NIRIM Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.

Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

(56) References Cited

OTHER PUBLICATIONS

Nowatari.H et al., "60.2: Intermediate Connector With Suppressed Voltage Loss for White Tandem OLEDs", SID Digest '09 : SID International Symposium Digest of Technical Papers, May 31, 2009, vol. 40, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ohara.H et al., "21.3:4.0 In. QVGA AMOLED Display Using In—Ga—Zn—Oxide TFTs With a Novel Passivation Layer", SID Digest '09 : SID International Symposium Digest of Technical Papers, May 31, 2009, pp. 284-287.

Ohara.H et al., "Amorphous In—Ga—Zn—Oxide TFTs with Suppressed Variation for 4.0 inch QVGA AMOLED Display", AM-FPD '09 Digest of Technical papers, Jul. 1, 2009, pp. 227-230, The Japan Society of Applied Physics.

Orita.M et al., "Amorphous transparent conductive oxide InGaO3(ZnO)m (m <4):a Zn4s conductor", Philosophical Magazine, 2001, vol. 81, No. 5, pp. 501-515.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn—Oxide TFT", SID Digest '09 : SID International Symposium Digst of Technical Papers, May 31, 2009, pp. 184-187.

Osada.T et al., "Development of Driver-Integrated Panel Using Amorphous In—Ga—Zn—Oxide TFT", AM-FPD '09 Digest of Technical Papers, Jul. 1, 2009, pp. 33-36.

Park.J et al., "Amorphous Indium—Gallium—Zinc Oxide TFTs and Their Application for Large Sized AMOLED", AM-FPD '08 Digest of Technical Papers, Jul. 2, 2008, pp. 275-278.

Park.J et al., "Dry etching of ZnO films and plasma-induced damage to optical properties", J. Vac. Sci. Technol. B. (Journal of Vacuum Science & Technology B), Mar. 1, 2003, vol. 21, No. 2, pp. 800-803.

Park.J et al., "Electronic Transport Properties of Amorphous Indium—Gallium—Zinc Oxide Semiconductor Upon Exposure to Water", Appl. Phys. Lett. 9Applied Physics Letters) , 2008, vol. 92, pp. 072104-1-072104-3.

Park.J et al., "High performance amorphous oxide thin film transistors with self-aligned top-gate structure", IEDM '09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters) , Jun. 26, 2007, vol. 90, No. 26, pp. 262106-1-262106-3.

Park.S et al., "Challenge to Future Displays: Transparent AM-OLED Driven by Peald Grown ZnO TFT", IMID '07 Digest, 2007, pp. 1249-1252.

Park.Sang-Hee et al., "42.3: Transparent ZnO Thin Film Transistor for the Application of High Aperture Ratio Bottom Emission AM-OLED Display", SID Digest '08 SID International Symposium Digest of Technical Papers, May 20, 2008, vol. 39, pp. 629-632.

Prins.M et al., "A Ferroelectric Transparent Thin-Film Transistor", Appl. Phys. Lett. (Applied Physics Letters) , Jun. 17, 1996, vol. 68, No. 25, pp. 3650-3652.

Sakata.J et al., "Development of 4.0-In. AMOLED Display With Driver Circuit Using Amorphous In—Ga—Zn—Oxide TFTs", IDW '09 : Proceedings of the 16th International Display Workshops, 2009, pp. 689-692.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Tsuda.K et al., "Ultra Low Power Consumption Technologies for Mobile TFT-LCDs ", IDW '02 : Proceedings of the 9th International Display Workshops, Dec. 4, 2002, pp. 295-298.

Ueno.K et al., "Field-Effect Transistor on SrTiO3 With Sputtered Al2O3 Gate Insulator", Appl. Phys. Lett. (Applied Physics Letters) , Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

\* cited by examiner

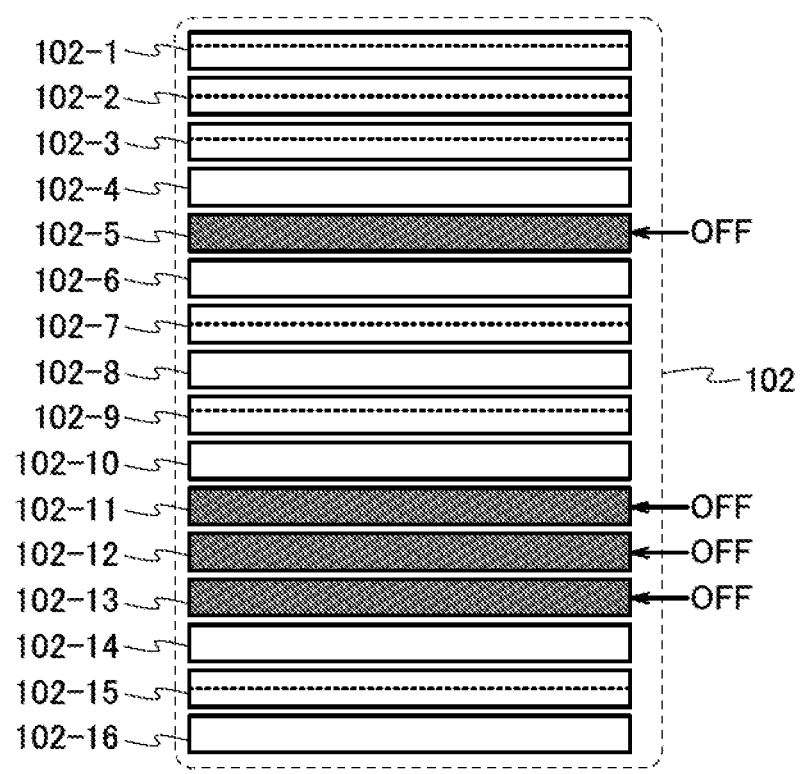

SEMICONDUCTOR DEVICE

BACKGROUND OF THE INVENTION

1. Field of the Invention

The present invention relates to a semiconductor device including a memory device.

2. Description of the Related Art

To increase operation speed and integration degree of a semiconductor device such as a CPU (central processing unit), miniaturization of a semiconductor element has been advanced, and manufacturing of a transistor with a channel length of approximately 30 nm has been achieved. On the other hand, by the miniaturization of the semiconductor element, consumed power (leakage power) due to leakage current of a transistor is increased in a CPU. Specifically, power consumption at the time of arithmetic (operation power) has conventionally accounted for almost all of the power consumption in a CPU; however, in recent years, leakage power takes up 10% or more of the total power consumption in a CPU.

Thus, a technique called normally off computing attracts attention, in which the power consumption of a CPU is reduced by blocking power supply for an integrated circuit which is not used with the use of a power gate. Particularly, in the case of a main memory, its capacity tends to be increased to achieve a high performance CPU. The capacity of a recent desktop personal computer has reached several gigabytes. Therefore, in a similar manner to a cache memory, a main memory corresponds to one of integrated circuits with large power consumption in a CPU.

Patent Document 1 discloses a computer system in which power supply to a main memory is stopped by a power supply control unit in response to the shift of a CPU into a power saving mode.

REFERENCE

Patent Document

[Patent Document 1] Japanese Published Patent Application No. 2010-044460

SUMMARY OF THE INVENTION

In the computer system disclosed in Patent Document 1, the power supply to the main memory needs to be stopped in a period in which access to the main memory is not carried out at all. However, as for a semiconductor device using a CPU, such as a computer or a server, there is a technical background in which the capacity of a main memory is increased by reducing the frequency of low speed access to an auxiliary device such as a hard disk to increase performance of the semiconductor device. Therefore, it is difficult to ensure a long period in which access to a main memory is not carried out. Accordingly, even when power supply is stopped in the period, the power consumption of the main memory is not largely reduced.

Under the technical background, an object of one embodiment of the present invention is to provide a semiconductor device which can consume less power.

The capacity of a cache (buffer memory device) is several tens megabytes at most, whereas the capacity of a main memory (main memory device) is increased to several gigabytes; the cache has an extremely smaller capacity than the main memory. Therefore, it is considered that data which is treated in a CPU core having functions of an arithmetic circuit, a control unit, and the like corresponds to merely a part of data which is stored in a main memory, and most part of the main memory is not accessed in a certain period even when a period in which access to the main memory is not carried out at all is short.

Thus, in one embodiment of the present invention, a plurality memory cells in a memory device having a function as a main memory is divided into a plurality of blocks and supply of power supply voltage is controlled for each block. Of the plurality of blocks included in the main memory, a block whose data is not referenced by a cache or a block whose data has not been accessed for a long time since the preceding access by the cache is carried out is recognized by a memory management unit. Then, the supply of the power supply voltage to one or both of the blocks is stopped by a power controller.

In one embodiment of the present invention, it is assumed that a memory cell whose data is most recently referenced by a cache and a memory cell in the vicinity of the memory cell in the main memory cell are likely to have the shortest period of time until the memory cell or the memory cell in the vicinity thereof is secondly referenced by the cache. Based on the above assumption, a block whose data is expected to have a long period of time until next access is predicted and supply of the power supply voltage to the block is stopped, so that leakage power can be reduced.

Further, in one embodiment of the present invention, a memory element in which writing and reading data can be performed by supply of power supply voltage and which can hold data in a predetermined period even when not powered is used for the memory cell. This structure prevents loss of data in the block in which the supply of the power supply voltage is stopped and makes it possible to read the data even after the supply of the power supply voltage is restarted.

Specifically, as the memory element, a memory element which is capable of holding data even when not powered and in which supply, holding, and release of charge to/in a capacitor or a floating node are controlled by a transistor which has small off-state current, or a memory element such as an MRAM, a ReRAM, or a FeRAM can be used.

In particular, in the case where the memory element in which supply, holding, and release of charge to/in a capacitor or a floating node are controlled by a transistor which has small off-state current, data is written by supply of charge; therefore, a current which is necessary for writing data can be reduced to approximately $\frac{1}{100}$ of that in the case where an MRAM is used. Accordingly, a semiconductor device according to one embodiment of the present invention which includes the memory element can consume less power.

Furthermore, in one embodiment of the present invention, a driver circuit, such as a decoder or an inverter, which supplies the memory cells in each row with a signal for individually selecting a plurality of memory cells on a row-by-row basis, is provided for each block. When supply of power supply voltage to one block is stopped, supply of the power supply voltage to the circuit, such as the decoder or the inverter, which corresponds to the block may be stopped.

This structure also enables a reduction in leakage power in the driver circuit such as the decoder or the inverter.

In one embodiment of the present invention, the above structure makes it possible to provide a semiconductor memory which can consume less power.

BRIEF DESCRIPTION OF THE DRAWINGS

FIG. 3 illustrates a structure of a main memory.

DETAILED DESCRIPTION OF THE INVENTION

Hereinafter, embodiments of the present invention will be described in detail with reference to the accompanying drawings. However, the present invention is not limited to the following description and it is easily understood by those skilled in the art that the mode and details can be variously changed without departing from the scope and spirit of the present invention. Accordingly, the present invention should not be construed as being limited to the description of the embodiments below.

The present invention includes in its category the following semiconductor devices: integrated circuits such as microprocessors, image processing circuits, digital signal processors (DSPs), and microcontrollers, RF tags, and semiconductor display devices. The semiconductor display devices include the following in its category: liquid crystal display devices, light-emitting devices in which a light-emitting element typified by an organic light-emitting element (OLED) is provided for each pixel, electronic paper, digital micromirror devices (DMDs), plasma display panels (PDPs), field emission displays (FEDs), and other semiconductor display devices in which a central processing unit is included in a driver circuit or a control circuit.

Embodiment 1

Figure 1A:
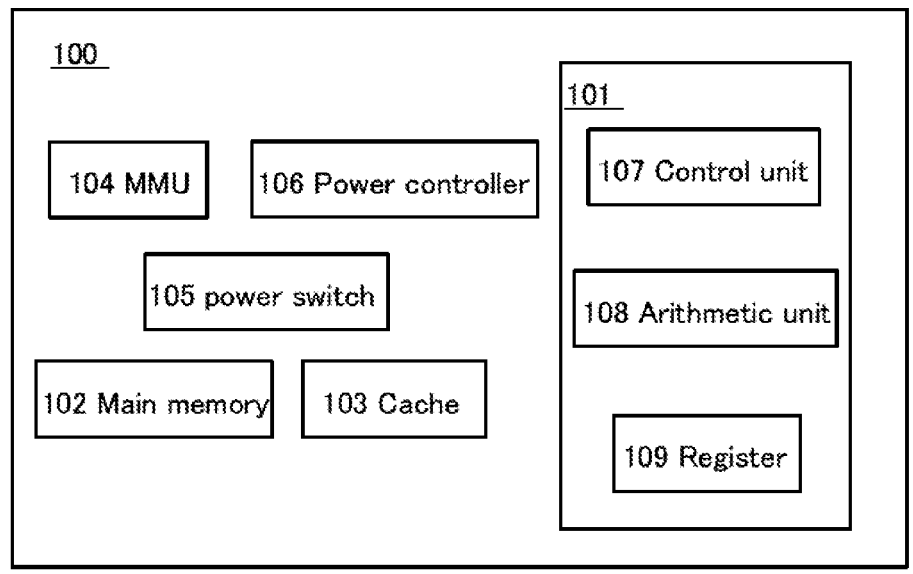
FIGS. 1A and 1B illustrate a structure of a semiconductor device.

FIG. 1A illustrates a block diagram of a structure of a semiconductor device 100 according to one embodiment of the present invention, as an example. Note that in the block diagram in FIG. 1A, circuits in the semiconductor device 100 are classified in accordance with their functions and separated blocks are illustrated. However, it is difficult to classify actual circuits according to their functions completely and there is a possibility that one circuit has a plurality of functions.

The semiconductor device 100 illustrated in FIG. 1A includes a CPU core 101, a main memory 102, a cache 103, a memory management unit (MMU) 104, a power switch 105, and a power controller 106.

The CPU core 101 in FIG. 1A includes a control unit 107, an arithmetic unit 108, and a register 109. The control unit 107 has a function of decoding and executing an instruction which is input. The arithmetic unit 108 has a function of performing a variety of arithmetic operations such as four arithmetic operations and logic operations. The register 109 has a function of storing data which is obtained during the arithmetic operation of the arithmetic unit 108, data obtained as a result of the arithmetic operation of the arithmetic unit 108, data of an instruction which is to be executed in the control unit 107, an address thereof, and the like.

Note that FIG. 1A illustrates a structure in which the control unit 107, the arithmetic unit 108, and the register 109 are independently included in the CPU core 101. Alternatively, a unit which has both the function as the control unit 107 and the function as the arithmetic unit 108 may be included in the CPU core 101. In addition, the register 109 may be part of the control unit 107, part of the arithmetic unit 108, or part of the unit having both the function of the control unit 107 and the function of the arithmetic unit 108.

The main memory 102 has a function of storing data which is used for the arithmetic operation in the arithmetic unit 108, data of an instruction to be executed in the control unit 107, and the like. The cache 103 has a function of temporarily storing frequently-used data of the data stored in the main memory 102.

In one embodiment of the present invention, the main memory 102 includes a plurality of memory cells for storing data. The plurality of memory cells is divided into several blocks each including one or more rows. Specifically, each of the blocks includes one or more rows of memory cells.

The MMU 104 has a function of recognizing an address of a memory cell of the main memory 102 which is referenced by the cache 103, i.e., recognizing whether or not the memory cell is accessed and data is copied. The MMU 104 can make a memory device such as a translation lookaside buffer (TLB) temporarily store the address of the memory cell whose data is referenced.

Note that part of the MMU 104 may function as the TLB or a memory device functioning as the TLB may be provided in the semiconductor device 100 separately from the MMU 104.

The power switch 105 has a function of controlling supply of power supply voltage to the main memory 102 for each block. The power switch 105 includes a plurality of switches. The plurality of switches controls supply of the power supply voltage to the respective blocks. Specifically, when one switch of the plurality of switches is on (in a conduction state), the power supply voltage is supplied to a corresponding block via the switch. When the switch of the plurality of switches is off (in a non-conduction state), the supply of the power supply voltage to the corresponding block via the switch is stopped.

The power controller 106 has a function of managing the supply of the power supply voltage to the blocks included in the main memory 102 by controlling the operation of the power switch 105. Specifically, the power controller 106 sends the power switch 105 an instruction to turn on a switch corresponding to a block to which the power supply voltage is to be supplied, of the plurality of switches included in the power switch 105. In addition, the power controller 106 sends the power switch 105 an instruction to turn off a switch corresponding to a block in which the supply of the power supply voltage is stopped, of the plurality of switches included in the power switch 105.

Note that the power controller 106 may have a function of controlling supply of the power supply voltage to a component which is included in the semiconductor device 100 and is not the main memory 102.

Figure 1B:
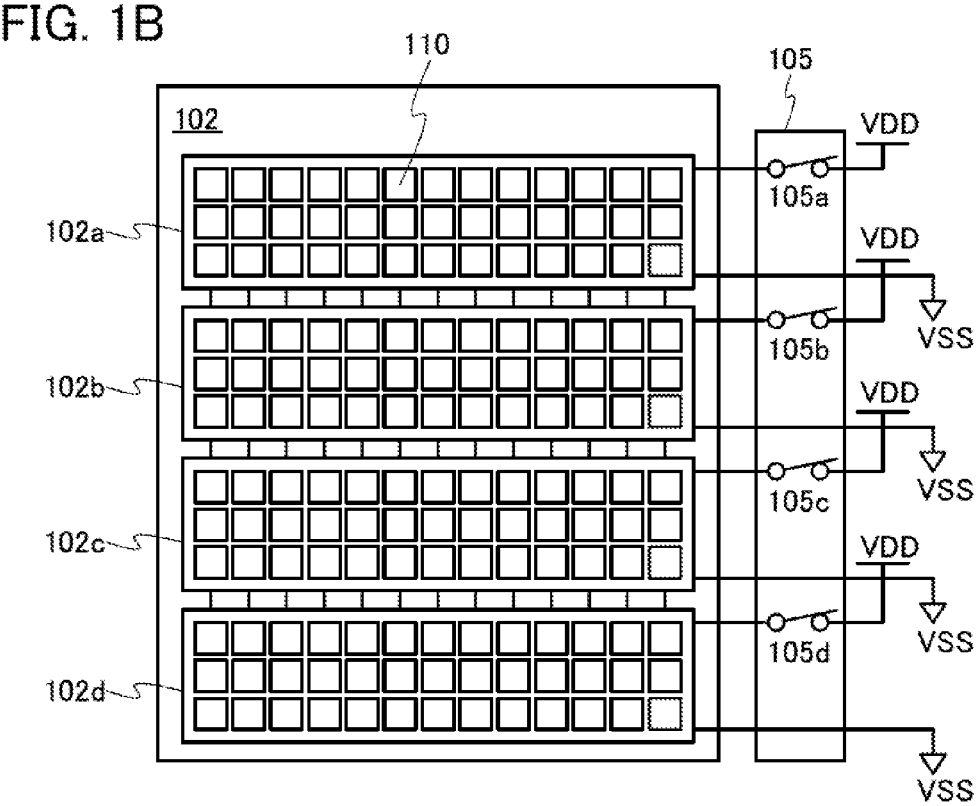

Next, FIG. 1B illustrates an example of a specific structure of the main memory 102 and the power switch 105.

The main memory 102 illustrated in FIG. 1B includes blocks 102a to 102d each including three rows of memory cells 110. Note that although FIG. 1B illustrates the example in which three rows of the memory cells 110 are included in one block, one, two, four, or more rows of memory cells 110 may be included in one block. In addition, FIG. 1B illustrates a case where the main memory 102 is divided into four blocks, but the number of the blocks is not limited to four as long as it is plural.

The power switch 105 includes switches 105a to 105d. A power supply potential VDD is applied to the blocks 102a to 102d via the respective switches 105a to 105d. A power supply potential VSS is applied to each of the blocks 102a to 102d. Accordingly, a power supply voltage which corresponds to a potential difference between the power supply potential VDD and the power supply potential VSS is supplied to each of the blocks 102a to 102d when a corresponding switch of the switches 105a to 105d is turned on.

Note that when one of the switches 105a to 105d is turned off, the power supply voltage VDD is not applied to a block of the blocks 102a to 102d which corresponds to the switch. Thus, the supply of the power supply voltage to the block is stopped.

In one embodiment of the present invention, the main memory 102 is divided into a plurality of blocks, and supply of power supply voltage can be controlled individually for each block. Therefore, the supply of the power supply voltage to a block which is not accessed can be stopped while the power supply voltage is supplied to a block which is accessed. Accordingly, a longer period in which the supply of the power supply voltage is stopped can be ensured in each block as compared to the case where the supply of the power supply voltage to the whole main memory 102 is collectively controlled, and as the period is increased, leakage power generated in the memory cell can be reduced accordingly.

Figure 2A:
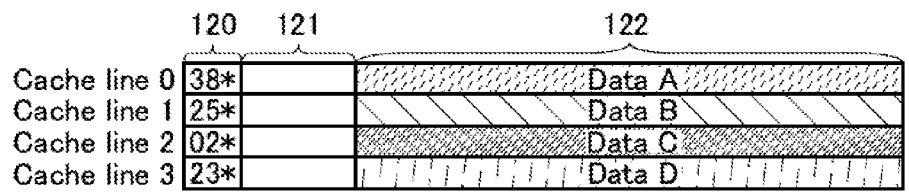
FIGS. 2A and 2B illustrate a structure of a semiconductor device.
Figure 2B:
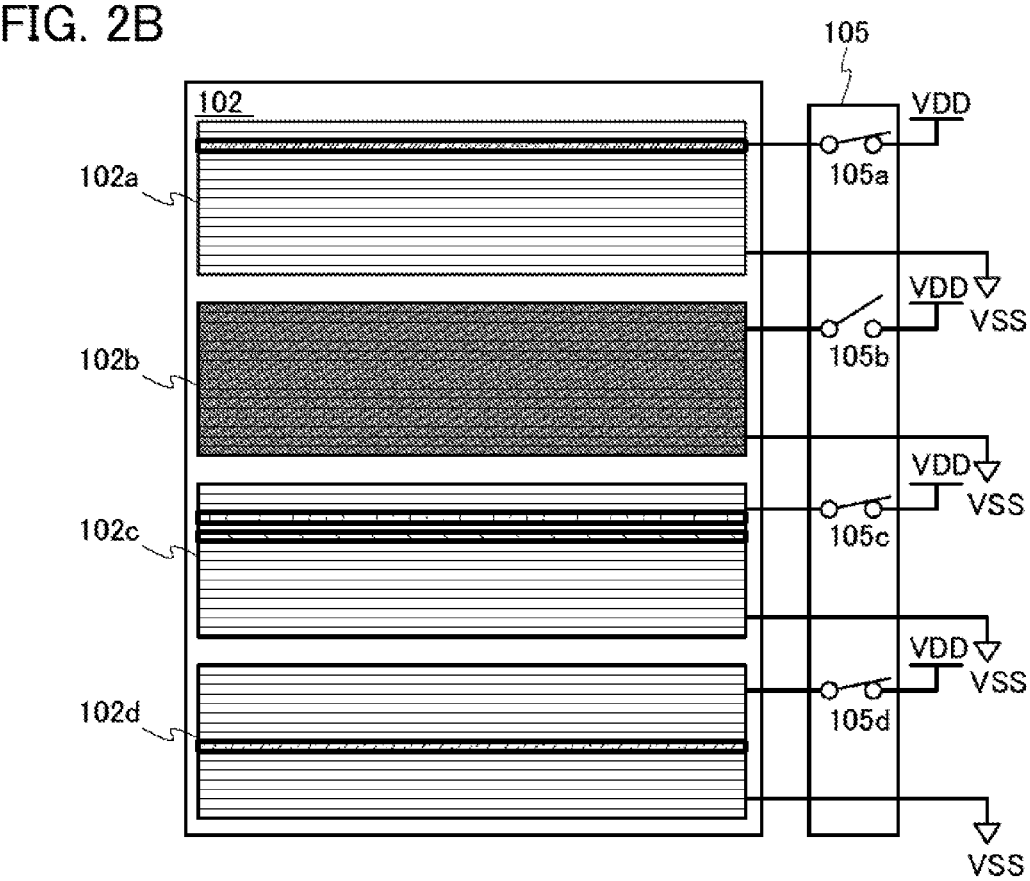

Next, an example of specific operation of the MMU 104 is described using, for example, the cache 103 having a structure illustrated in FIG. 2A and the main memory 102 and the power switch 105 having a structure illustrated in FIG. 2B.

The cache 103 includes a plurality of memory regions called cache lines. FIG. 2A illustrates an example in which the cache 103 includes four cache lines, i.e., cache lines 0 to 3. In addition, each memory region as a cache line is divided into three memory regions, i.e., a tag 120, a dirty bit 121, and a data field 122. Data which is sent from the main memory 102 is stored in the data field 122. An address of the main memory 102 which corresponds to the data of the data field 122 is stored in the tag 120. Data which indicates whether or not the data stored in the data field 122 corresponds to the data of the main memory 102 is stored in the dirty bit 121.

Note that any of a direct mapped structure, a fully associative structure, and a set associative structure may be employed as a data storage structure of the cache 103.

Like FIG. 1B, FIG. 2B illustrates an example in which the main memory 102 includes four blocks, i.e., the 0th to 3rd blocks 102a to 102d. In addition, the example in FIG. 2B illustrates the case where the blocks 102a to 102d each include sixteen rows of memory cells, i.e., 0th to 15th rows of memory cells. The switches 105a to 105d included in the power switch 105 respectively control supply of the power supply voltage to the blocks 102a to 102d.

In FIG. 2A, data A which is stored in a memory cell in the 8th row included in the 3rd block 102d of the main memory 102 illustrated in FIG. 2B is stored in the data field 122 of the cache line 0. Therefore, an address of the memory cell is stored in the tag 120 of the cache line 0. Note that an address indicating a column of the memory cell storing the data A among the memory cells in the 8th row may also be stored in the tag 120 of the cache line 0.

Therefore, when the address stored in the tag 120 is a serial number including the address of the block, the address of the row of the memory cell, and the address of the column of the memory cell (which is an arbitrary address "*" in this embodiment), an address "38*" is stored in the tag 120 of the cache line 0 in FIG. 2A.

Similarly, in FIG. 2A, data B which is stored in a memory cell of the 5th row included in the 2nd block 102c of the main memory 102 in FIG. 2B is stored in the data field 122 of the cache line 1. Therefore, an address "25*" is stored in the tag 120 of the cache line 1 in FIG. 2A.

Similarly, in FIG. 2A, data C which is stored in a memory cell of the 2nd row included in the 0th block 102a of the main memory 102 in FIG. 2B is stored in the data field 122 of the cache line 2. Therefore, an address "02*" is stored in the tag 120 of the cache line 2 in FIG. 2A.

Similarly, in FIG. 2A, data D which is stored in a memory cell of the 3rd row included in the 2nd block 102c of the main memory 102 in FIG. 2B is stored in the data field 122 of the cache line 3. Therefore, an address "23*" is stored in the tag 120 of the cache line 3 in FIG. 2A.

The MMU 104 makes the TLB store an address of a memory cell whose data is referenced. Then, the MMU 104 calculates, using the address, the number of rows of memory cells which are referenced by the cache 103 or the number of the memory cells of every block. The calculated number of rows of memory cells or the number of the memory cells of every block can be stored in the TLB.

In one embodiment of the present invention, it is assumed that a memory cell whose data is most recently referenced by the cache 103 and a memory cell in the vicinity of the memory cell in the main memory 102 are likely to have the shortest period of time until the memory cell or the memory cell in the vicinity is secondly referenced by the cache 103. Based on the above assumption, in the case of FIGS. 2A and 2B, the number of rows of memory cells which are referenced by the cache 103 and the number of the memory cells are 0 in the 1st block 102b and thus it is presumed that among the four blocks, the 1st block 102b has the longest period until next access.

The MMU 104 has functions of selecting a block which is expected to have a long period of time until next access and informing the power controller 106 of the address of the block. Alternatively, the MMU 104 may inform the power controller 106 of the calculated number of rows of memory cells or the number of the memory cells of every block. In this case, a block which is expected to have a long period of time until next access is selected by the power controller 106.

To stop the supply of the power supply voltage to the selected block, the power controller 106 sends the power switch 105 an instruction to control the operations of the switches. FIG. 2B illustrates the case where the switch 105b for the block 102b is turned off in response to the instruction sent from the power controller 106 to the power switch 105. When the switch 105b is turned off, the supply of the power supply voltage to the block 102b is stopped.

Note that FIGS. 2A and 2B illustrate the example in which the cache 103 includes the four cache lines and four rows of memory cells in the main memory 102 are referenced by the cache 103; however, in reality, it is assumed that the cache 103 has more cache lines. In this case, the number of rows of memory cells which are referenced by the cache 103 or the number of the memory cells becomes larger. In one embodiment of the present invention, in the MMU 104, the number of rows of memory cells referenced by the cache 103 or the number of the memory cells of every block may be strictly calculated, and when the above number is large, there may be a limitation on the number to be calculated. In such a case, when the number of rows of memory cells or number of the memory cells in each block reaches its limit, the calculation in the block is terminated.

Alternatively, the MMU 104 does not calculate the number of rows of memory cells or the number of the memory cells but may determine whether or not a memory cell whose data is referenced exists in every block. In addition, the MMU 104 may calculate the number of cache lines whose data is referenced for each block, using the address of the memory cell whose data is referenced. Even in either case, a block whose data is not referenced can be specified from an access history of the cache 103.

In addition, in one embodiment of the present invention, by using not only the access history of the cache 103 but also the time or frequency of the access by the cache 103, a block in which supply of the power supply voltage is stopped may be selected by the MMU 104 or the power controller 106.

In one embodiment of the present invention, a block in which the supply of the power supply voltage is stopped can be selected by both the MMU 104 and the power controller 106. In this case, for example, the MMU 104 selects a block to which the supply of the power supply voltage is to be stopped according to the access history and turns off a switch corresponding to the block. Next, the power controller 106 can select an additional block to which the supply of the power supply voltage is to be stopped according to the time or frequency of the access.

In addition to a block which is expected to have a short period of time until next access according to the access history of the cache 103, a block adjacent to the block may be supplied with the power supply voltage. As illustrated in FIG. 3, out of blocks 102-1 to 102-16 included in the main memory 102, when a period of time until next access of the blocks 102-1, 102-2, 102-3, 102-7, 102-9, and 102-15 is expected to be short according to the access history of the cache 103, the blocks 102-4, 102-6, 102-8, 102-10, 102-14, and 102-16 which are adjacent to the blocks are also supplied with the power supply voltage. In other words, in the case of the main memory 102 illustrated in FIG. 3, supply of the power supply voltage to the blocks 102-5, 102-11, 102-12, and block 102-13 is stopped.

In one embodiment of the present invention, the block which is expected to have a shorter period of time until next access than any other block is selected by the CPU core 101 according to the access history of the cache 103 to the main memory 102, whereby the supply of the power supply voltage to blocks which are not accessed can be stopped while the power supply voltage is supplied to the block which is accessed. Accordingly, a longer period in which the supply of the power supply voltage is stopped can be ensured in each block as compared to the case where the supply of the power supply voltage to the whole main memory 102 is collectively controlled, and as the period is increased, leakage power generated in the memory cell can be reduced.

Further in one embodiment of the present invention, not only supply of power supply voltage to the memory cells included in the main memory cell but also supply of the power supply voltage to the driver circuit which individually selects the rows of the memory cells may be controlled for each block.

Figure 4:
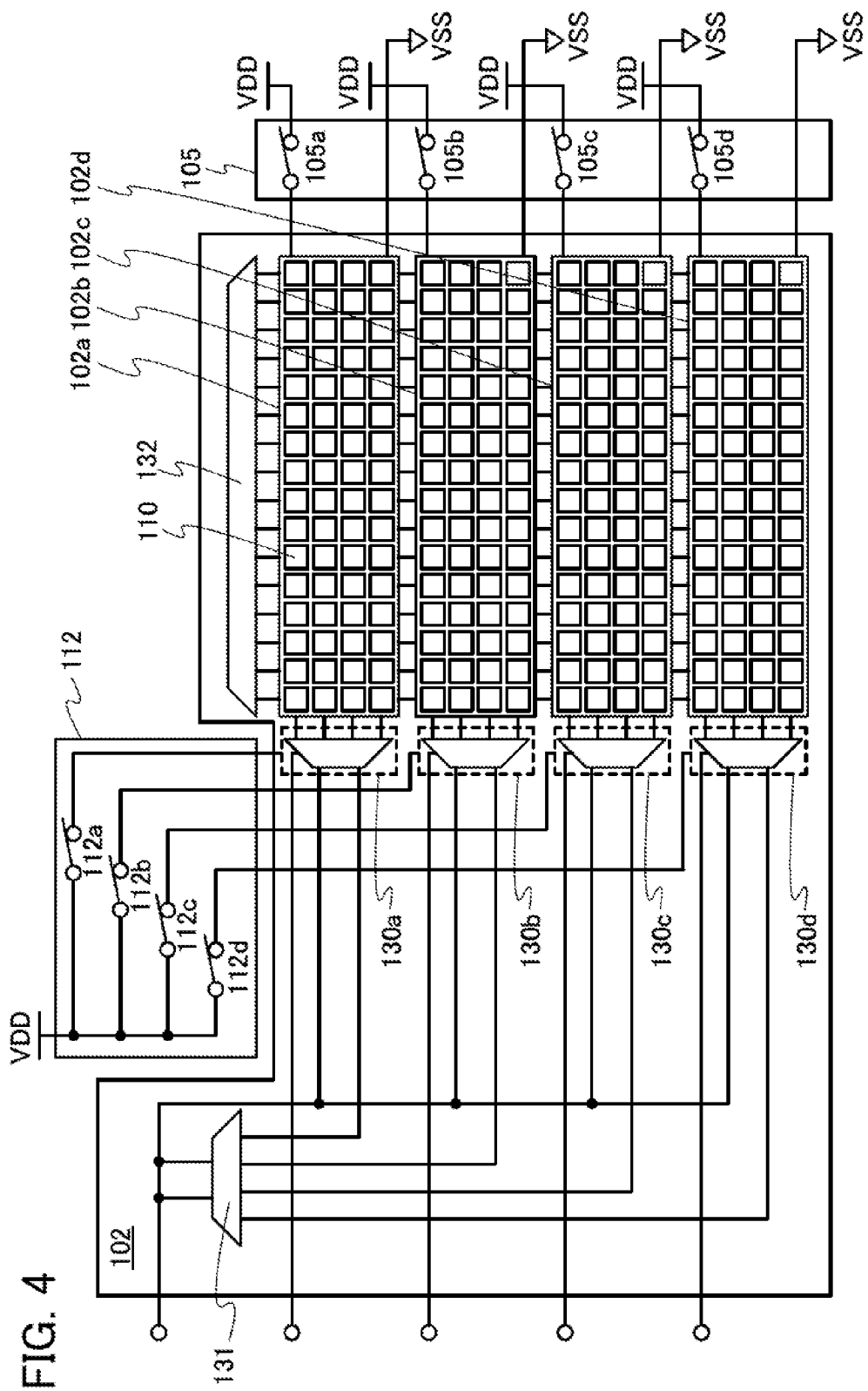
FIG. 4 illustrates a structure of a semiconductor device.

FIG. 4 illustrates an example of a connection structure among the main memory 102, the power switch 105, and a power switch 112 in the semiconductor device 100 according to one embodiment of the present invention. The main memory 102 includes the blocks 102a to 102d each including plural rows of the memory cells 110. The power switch 105 can control the supply of the power supply voltage to the blocks 102a to 102d.

The main memory 102 illustrated in FIG. 4 includes row decoders 130a to 130d each of which individually selects the rows of the memory cells 110 of the corresponding blocks at the time of writing and reading data to/from the main memory 102 and a row decoder 131 which selects the row decoders 130a to 130d. The row decoder 131 selects one of the row decoders 130a to 130d, and the selected row decoder selects one row of the memory cells 110.

The main memory 102 illustrated in FIG. 4 includes a column decoder 132 which selects individual columns of the memory cells 110. Accordingly, from the memory cells 110 in the one row which is selected by the row decoder 131 and the row decoders 130a to 130d, one or a plurality of memory cells 110 are selected by the column decoder 132.

The power switch 112 illustrated in FIG. 4 can control supply of the power supply voltage to the row decoders 130a to 130d. Specifically, the power switch 112 includes four switches 112a to 112d in FIG. 4.

The power supply potential VDD is applied to the row decoders 130a to 130d via the respective switches 112a to 112d. The power supply potential VSS (not illustrated) is applied to each of the row decoders 130a to 130d. Therefore, a power supply voltage which corresponds to a potential difference between the power supply potential VDD and the power supply potential VSS is supplied to each of the row decoders 130a to 130d when the corresponding one of the switches 112a to 112d is turned on.

Note that in the case where one of the switches 112a to 112d is turned off, one of the row decoders 130a to 130d which corresponds to the switch is not supplied with the power supply potential VDD. Accordingly, the supply of the power supply voltage to the decoder is stopped.

Note that whether or not the power supply voltage is supplied to the row decoders 130a to 130d is determined by whether or not the power supply voltage is supplied to the corresponding blocks 102a to 102d. For example, when the supply of the power supply voltage to the block 102a is stopped by turning off the switch 105a, the supply of the power supply voltage to the row decoder 130a, which corresponds to the block 102a, is also stopped by turning off the switch 112a.

Note that the power supply voltage supplied to the row decoders 130a to 130d may have a different level from that supplied to the blocks 102a to 102d.

Although FIG. 4 illustrates the structure in which supply of the power supply voltage to the decoder is controlled for each block, supply of the power supply voltage to another circuit included in the driver circuit, such as an inverter, may also be controlled for each block.

Figure 5A:
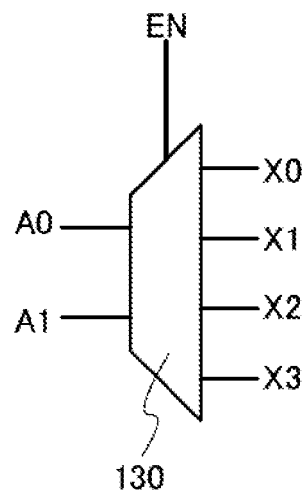
FIGS. 5A and 5B illustrate a structure of a decoder.
Figure 5B:
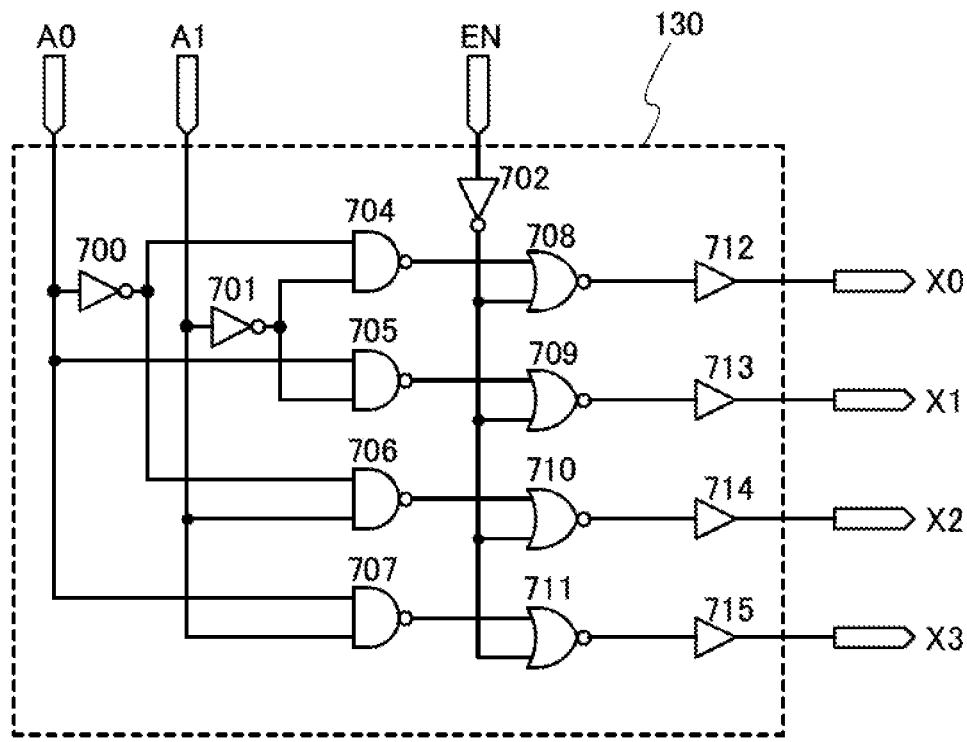

Next, an example of a structure of each of the row decoders 130a to 130d (hereinafter referred to as a row decoder 130 in FIGS. 5A and 5B) is illustrated in FIGS. 5A and 5B. FIG. 5A shows a circuit symbol of the row decoder 130 and FIG. 5B illustrates an example of a specific circuit configuration of the row decoder 130 which corresponds to the circuit symbol in FIG. 5A.

In the row decoder 130 illustrated in FIGS. 5A and 5B, a signal having an address of a memory cell as data is supplied to a terminal A0 and a terminal A1. An enable signal is supplied from a terminal EN to the row decoder 130. In the row decoder 130, when the digital value of the enable signal is "1", the digital value of a signal which is output from only one of terminals X0 to X3 is "1" and the digital values of signals which are output from the other of the terminals X0 to X3 are "0". In addition, in the row decoder 130, when the digital value of the enable signal is "0", the digital values of signals which are output from all of the terminals X0 to X3 are "0".

Specifically, the row decoder 130 illustrated in FIG. 5B includes logic elements such as inverters 700 to 702, NANDs 704 to 707, NORs 708 to 711, and buffers 712 to 715. Note that the buffers 712 to 715 are not necessarily provided in the row decoder 130. The buffers 712 to 715 each have a function of an impedance converter. Therefore, when the buffers 712 to 715 are provided in the row decoder 130, a capability of the row decoder 130 to supply power to a memory cell can be increased.

A power supply voltage which is applied to the row decoder 130 is applied to each of the logic elements. Therefore, stop of the supply of the power supply voltage to the row decoder 130 can reduce leakage power generated in each of the logic elements.

Figure 6:
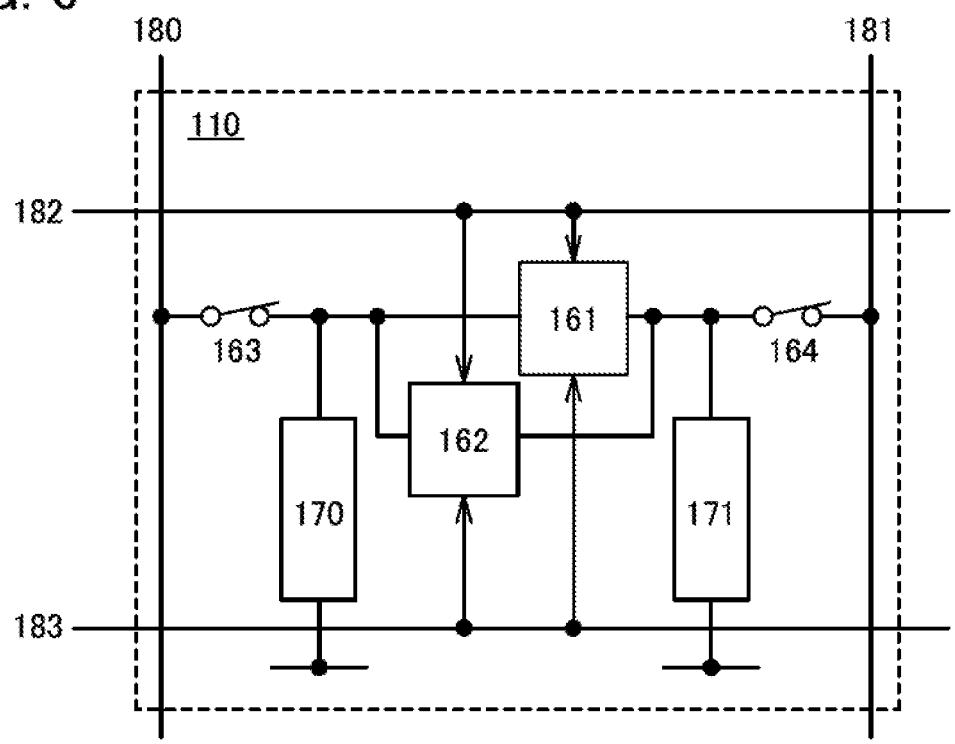
FIG. 6 illustrates a structure of a memory cell.

Next, FIG. 6 illustrates an example of a structure of the memory cell 110.

The memory cell 110 includes logic elements 161 and 162, switches 163 and 164, and memory circuits 170 and 171.

The logic elements 161 and 162 each have a function of inverting the polarity of the potential of its input terminal and outputting the potential with the inverted polarity from its output terminal. Specifically, an inverter, a clocked inverter, or the like can be used as each of the logic elements 161 and 162. The input terminal of the logic element 161 and the input terminal of the logic element 162 are connected to the output terminal of the logic element 162 and the output terminal of the logic element 161, respectively.

Note that the term "connection" in this specification refers to electrical connection and corresponds to the state in which current, a potential, or voltage can be supplied or transmitted. Accordingly, a connection state means not only a state of direct connection but also a state of indirect connection through an element such as a wiring, a resistor, a diode, or a transistor so that current, voltage, or a potential can be supplied or transmitted.

In addition, even when different components are connected to each other in a circuit diagram, there is actually a case where one conductive film has functions of a plurality of components such as a case where part of a wiring serves as an electrode. The term "connection" also means such a case where one conductive film has functions of a plurality of components.

Wirings 180 to 183 are connected to the memory cell 110. Writing and reading of data to/from the memory cell 110 are performed via the wirings 180 and 181. The switch 163 has a function of controlling writing of data supplied to the wiring 180 to the logic elements 161 and 162, and reading of the data from the logic elements 161 and 162 to the wiring 180. The switch 164 has a function of controlling writing of data supplied to the wiring 181 to the logic elements 161 and 162, and reading of the data from the logic elements 161 and 162 to the wiring 181.

Specifically, in FIG. 6, the switch 163 has a function of controlling electrical connection between the input terminal of the logic element 161 and the wiring 180. In addition, the switch 164 has a function of controlling electrical connection between the input terminal of the logic element 162 and the wiring 181.

The wirings 182 and 183 each have a function of applying a power supply potential to the memory cell 110. Specifically, in FIG. 6, a potential difference between a power supply potential which is applied to the wiring 182 and a power supply potential which is applied to the wiring 183 is applied to the logic elements 161 and 162 as a power supply voltage.

Note that in the case of the logic elements 161 and 162, a state without application of the power supply voltage refers to a state where a potential difference between the wiring 182 and the wiring 183 is almost zero.

The application of the power supply voltage to the logic elements 161 and 162 enables the logic elements 161 and 162 to hold data which is written via the switches 163 and 164.

Even when the supply of the power supply voltage to the memory cell 110 is stopped, the memory circuits 170 and 171 are capable of storing data held in the logic elements 161 and 162. Specifically, in FIG. 6, the memory circuit 170 is connected to the input terminal of the logic element 161 and the memory circuit 171 is connected to the input terminal of the logic element 162. In the case where the above structure is employed, the data held in the logic elements 161 and 162 can be retracted into the memory circuits 170 and 171 before the supply of power supply voltage to the memory cell 110 is stopped, thereby preventing loss of the data.

Note that a circuit element which can hold data in a period in which the supply of the power supply voltage is stopped, such as a capacitor, an MRAM, a ReRAM, a FeRAM, or the like can be used as the memory circuits 170 and 171.

The memory cell 110 may further include another circuit element such as a transistor, a diode, a resistor, or an inductor as needed.

Note that in the memory cell 110 illustrated in FIG. 6, the power supply voltage may be applied to the logic elements 161 and 162 through different routes. This structure enables a state where the power supply voltage is applied to one of the logic elements 161 and 162 and the power supply voltage is not applied to the other thereof at the time when the data held in the memory circuits 170 and 171 is returned to the logic elements 161 and 162. Therefore, the following operations can be performed not at the same time but sequentially: application of the power supply voltage to only one of the logic elements 161 and 162; writing of the retracted data to the logic elements 161 and 162; and holding of the data in the logic elements 161 and 162 by application of the power supply voltage to both of the logic elements 161 and 162. Accordingly, the data retracted into the memory circuits 170 and 171 can be prevented from being wrongly lost when the data is returned to the logic elements 161 and 162, thereby ensuring high reliability of the data.

Figure 7A:
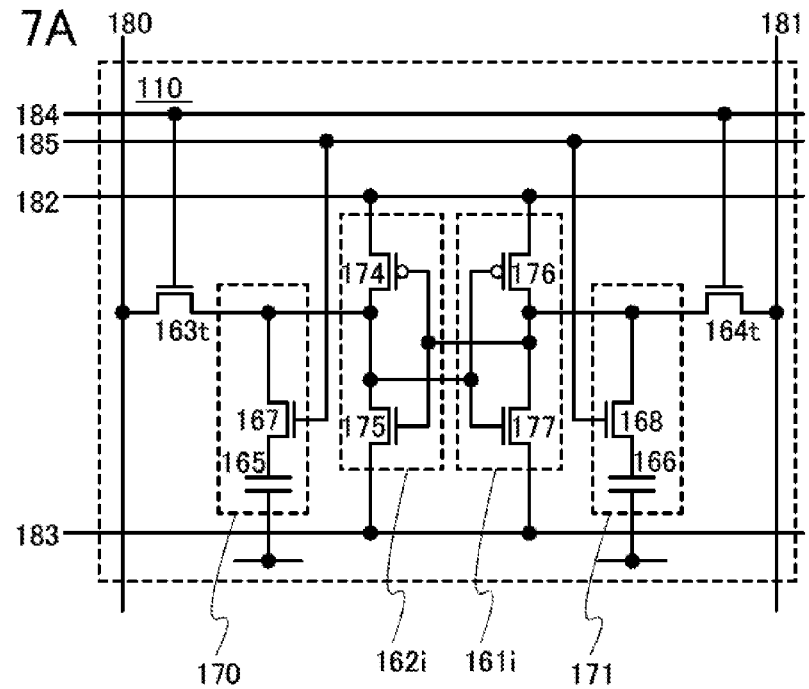
FIGS. 7A and 7B each illustrate a structure of a memory cell.

Next, an example of a specific structure of the memory cell 110 in FIG. 6 is described using FIG. 7A.

The memory cell 110 illustrated in FIG. 7A includes a transistor 163*t* which functions as the switch 163; a transistor 164*t* which functions as the switch 164; an inverter 161*i* which corresponds to one example of the logic element 161; an inverter 162*i* which corresponds to one example of the logic element 162; a transistor 167 and a capacitor 165 which correspond to one example of the memory circuit 170; and a transistor 168 and a capacitor 166 which correspond to one example of the memory circuit 171. An input terminal of the inverter 161*i* and an input terminal of the inverter 162*i* are connected to an output terminal of the inverter 162*i* and an output terminal of the inverter 161*i*, respectively.

The capacitor 165 is connected to the input terminal of the inverter 161*i* via the transistor 167 so as to store data which is held in the inverters 161*i* and 162*i* as needed. The capacitor 166 is connected to the input terminal of the inverter 162*i* via the transistor 168 so as to store data held in the inverters 161*i* and 162*i* as needed.

Specifically, the capacitor 165 is a capacitor in which a dielectric is provided between a pair of electrodes. One of the electrodes is connected to the input terminal of the inverter 161*i* via the transistor 167 and the other of the electrodes is connected to a node to which a potential such as a ground potential is applied. The capacitor 166 is a capacitor in which a dielectric is provided between a pair of electrodes. One of the electrodes is connected to the input terminal of the inverter 162*i* via the transistor 168 and the other of the electrodes is connected to a node to which a potential such as a ground potential is applied.

In one embodiment of the present invention, the transistors 167 and 168 have extremely small off-state current. This structure enables the memory circuits 170 and 171 to hold data by turning off the transistors 167 and 168 even when supply of the power supply voltage to the memory cell 110 is stopped. Accordingly, the data held in the inverters 161*i* and 162*i* can be retracted into the memory circuits 170 and 171 before the supply of the power supply voltage to the memory cell 110 is stopped, thereby preventing loss of the data.

The transistors 163*t* and 164*t* each may be either an n-channel transistor or a p-channel transistor. FIG. 7A illustrates an example in which both of the transistors 163*t* and 164*t* are n-channel transistors.

In FIG. 7A, the inverter 161*i* includes a p-channel transistor 176 and an n-channel transistor 177. The inverter 162*i* includes a p-channel transistor 174 and an n-channel transistor 175.

One of a source terminal and a drain terminal of the transistor 163*t* is connected to the wiring 180 and the other of the source terminal and the drain terminal of the transistor 163*t* is connected to a gate electrode of the transistor 176 and a gate electrode of the transistor 177. A gate electrode of the transistor 163*t* is connected to a wiring 184. One of a source terminal and a drain terminal of the transistor 164*t* is connected to the wiring 181 and the other of the source terminal and the drain terminal of the transistor 164*t* is connected to a gate electrode of the transistor 174 and a gate electrode of the transistor 175. A gate electrode of the transistor 164*t* is connected to the wiring 184.

Note that a "source terminal" of a transistor means a source region that is part of an active layer or a source electrode that is connected to an active layer. Similarly, "drain terminal" of a transistor means a drain region that is a part of an active layer or a drain electrode connected to an active layer.

One of a source terminal and a drain terminal of the transistor 167 is connected to the gate electrode of the transistor 176 and the gate electrode of the transistor 177 and the other of the source terminal and the drain terminal of the transistor 167 is connected to one electrode of the capacitor 165. A gate electrode of the transistor 167 is connected to a wiring 185. One of a source terminal and a drain terminal of the transistor 168 is connected to the gate electrode of the transistor 174 and the gate electrode of the transistor 175 and the other of the source terminal and the drain terminal of the transistor 168 is connected to one electrode of the capacitor 166. A gate electrode of the transistor 168 is connected to the wiring 185.

One of a source terminal and a drain terminal of the transistor 174 is connected to the wiring 182 and the other of the source terminal and the drain terminal of the transistor 174 is connected to the gate electrode of the transistor 176 and the gate electrode of the transistor 177. One of a source terminal and a drain terminal of the transistor 175 is connected to the wiring 183 and the other of the source terminal and the drain terminal of transistor 175 is connected to the gate electrode of the transistor 176 and the gate electrode of the transistor 177. One of a source terminal and a drain terminal of the transistor 176 is connected to the wiring 182 and the other of the source terminal and the drain terminal of transistor 176 is connected to the gate electrode of the transistor 174 and the gate electrode of the transistor 175. One of a source terminal and a drain terminal of the transistor 177 is connected to the wiring 183 and the other of the source terminal and the drain terminal of transistor 177 is connected to the gate electrode of the transistor 174 and the gate electrode of the transistor 175.

In the inverter 161*i* having the above structure, the gate electrode of the transistor 176 and the gate electrode of the transistor 177 function as the input terminal of the inverter 161*i*. Further, in the inverter 161*i*, the other of the source terminal and the drain terminal of the transistor 176 and the other of the source terminal and the drain terminal of the transistor 177 function as the output terminal of the inverter 161*i*. In the inverter 162*i* having the above structure, the gate electrode of the transistor 174 and the gate electrode of the transistor 175 function as the input terminal of the inverter 162*i*. Further, in the inverter 162*i*, the other of the source terminal and the drain terminal of the transistor 174 and the other of the source terminal and the drain terminal of the transistor 175 function as the output terminal of the inverter 162*i*.

Note that the memory cell 110 may further include another circuit element such as a transistor, a diode, a resistor, or an inductor as needed.

Figure 7B:
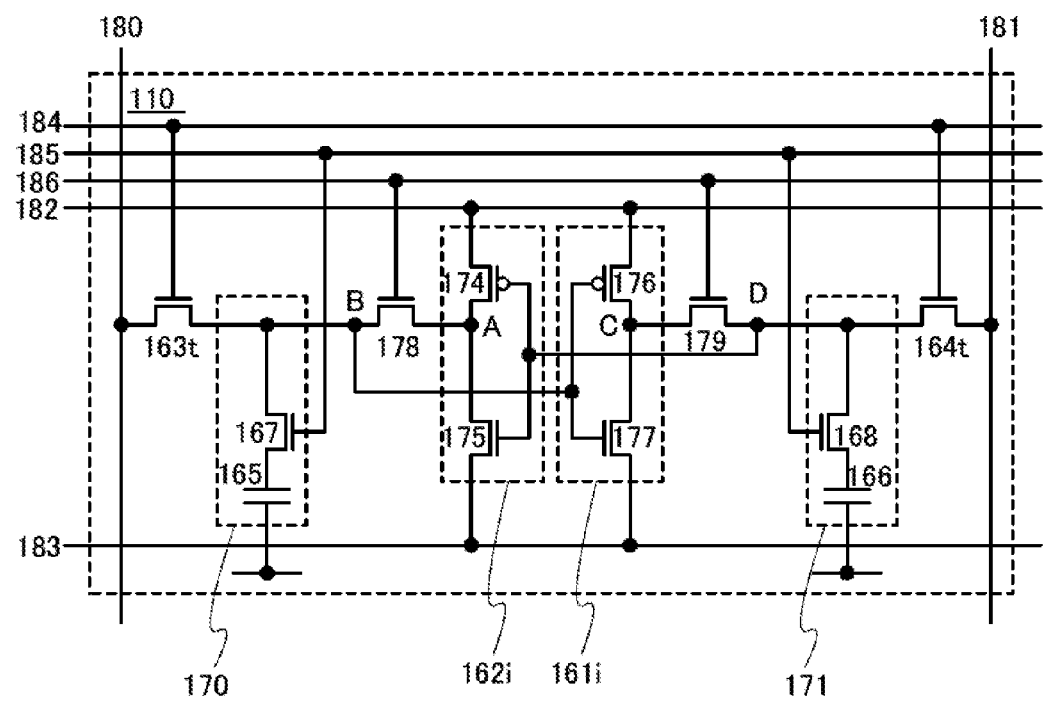

FIG. 7B illustrates a structure which is obtained by adding a transistor 178 and a transistor 179 to the memory cell 110 in FIG. 7A.

Specifically, the transistor 178 has a function of controlling connection between a node A and a node B. At the node A, the other of the source terminal and the drain terminal of the transistor 174 and the other of the source terminal and the drain terminal of the transistor 175 are connected to each other. At the node B, the gate electrode of the transistor 176, the gate electrode of the transistor 177, and the other of the source terminal and the drain terminal of the transistor 163*t* are connected to each other. The transistor 179 has a function of controlling connection between a node C and a node D. At the node C, the other of the source terminal and the drain terminal of the transistor 176 and the other of the source terminal and the drain terminal of the transistor 177 are connected to each other. At the node D, the gate electrode of the transistor 174, the gate electrode of the transistor 175, and the other of the source terminal and the drain terminal of the transistor 164*t* are connected to each other.

Note that in FIGS. 7A and 7B, each of the transistor 163*t*, the transistor 164*t*, the transistor 167, and the transistor 168 may include a plurality of transistors. Further, in FIG. 7B, each of the transistor 178 and the transistor 179 may include a plurality of transistors. In the case where each of the transistors includes a plurality of transistors, the plurality of transistors may be connected to each other in parallel, in series, or in combination of parallel connection and series connection.

Note that in this specification, the state in which first and second transistors are connected to each other in series means the state in which only one of source and drain terminals of the first transistor is connected to only one of source and drain terminals of the second transistor. In addition, the state in which the transistors are connected to each other in parallel means the state in which one of source and drain terminals of a first transistor is connected to one of source and drain terminals of a second transistor and the other of the source and drain terminals of the first transistor is connected to the other of the source and drain terminals of the second transistor.

Note that the terms "source terminal" and "drain terminal" of a transistor interchange with each other depending on the type of the channel of the transistor or levels of potentials applied to the source terminal and the drain terminal. In general, as for a source terminal and a drain terminal in an n-channel transistor, one to which a lower potential is supplied is called a source terminal, and one to which a higher potential is supplied is called a drain terminal. Further, as for a source terminal and a drain terminal in a p-channel transistor, one to which a lower potential is supplied is called a drain terminal, and one to which a higher potential is supplied is called a source terminal. In this specification, although the connection relation of the transistor is described assuming that the source terminal and the drain terminal are fixed in some cases for convenience, actually, the names of the source terminal and the drain terminal interchange with each other depending on the relation of the potentials.

Although FIGS. 7A and 7B each illustrate the example in which the transistor serves as a switch has a single-gate structure, the transistor may have a multi-gate structure in which a plurality of electrically connected gate electrodes are included so that a plurality of channel formation regions are included.

In the memory cell 110 illustrated in FIGS. 7A and 7B, the transistor 167 is turned off, so that charge is held in the capacitor 165. Further, the transistor 168 is turned off, so that charge is held in the capacitor 166. Therefore, the transistor 167 and the transistor 168 preferably have a small off-state current. When the transistor 167 and the transistor 168 have small off-state current, the amount of charge leaking from the capacitor 165 and the capacitor 166 can be reduced, so that data can be surely held in the memory circuit 170 and the memory circuit 171.

When a semiconductor which has a wide band gap and is highly purified by reduction of an impurity serving as an electron donor (donor), such as moisture or hydrogen, and by reduction of oxygen vacancies is used for a channel formation of a transistor, the transistor has extremely small off-state current. In the case where the transistor is used as each of the transistors 167 and 168, data can be surely held in the memory circuits 170 and 171.

Note that the transistor 163t, the transistor 164t, and the transistors 174 to 177 each may be a transistor including a channel formation region containing a wide band gap semiconductor such as an oxide semiconductor or may be a transistor including a channel formation region containing a semiconductor such as silicon or germanium. A transistor which includes a channel formation region containing a semiconductor such as silicon or germanium having crystallinity has high mobility. When the transistor is used as each of the transistor 163t, the transistor 164t, and the transistors 174 to 177, writing and reading data to/from the memory cell 110 can be performed at high speed.

The transistor 163t, the transistor 164t, the transistors 174 to 177, the transistor 167, and the transistor 168 are stacked, whereby the integration degree of the main memory can be increased.

A current which is necessary for writing data in the memory cell 110 having any of the structures illustrated in FIGS. 7A and 7B is small as compared to that in a memory cell in which an MRAM or the like is used for a memory circuit. Specifically, it is said that a writing current per cell in an MRAM is 50 μA to 500 μA; in the memory cell 110 having any of the structures illustrated in FIGS. 7A and 7B, since data is retracted by supply of charge to the capacitor, a current which is necessary for writing data can be reduced to approximately 1/100 of that of the MRAM. Therefore, the semiconductor device having any of the structures illustrated in FIGS. 7A and 7B according to one embodiment of the present invention consumes less power than a semiconductor device including an MRAM.

Embodiment 2

In this embodiment, an example of calculation of the off-state current of a transistor will be described.

Figure 8:
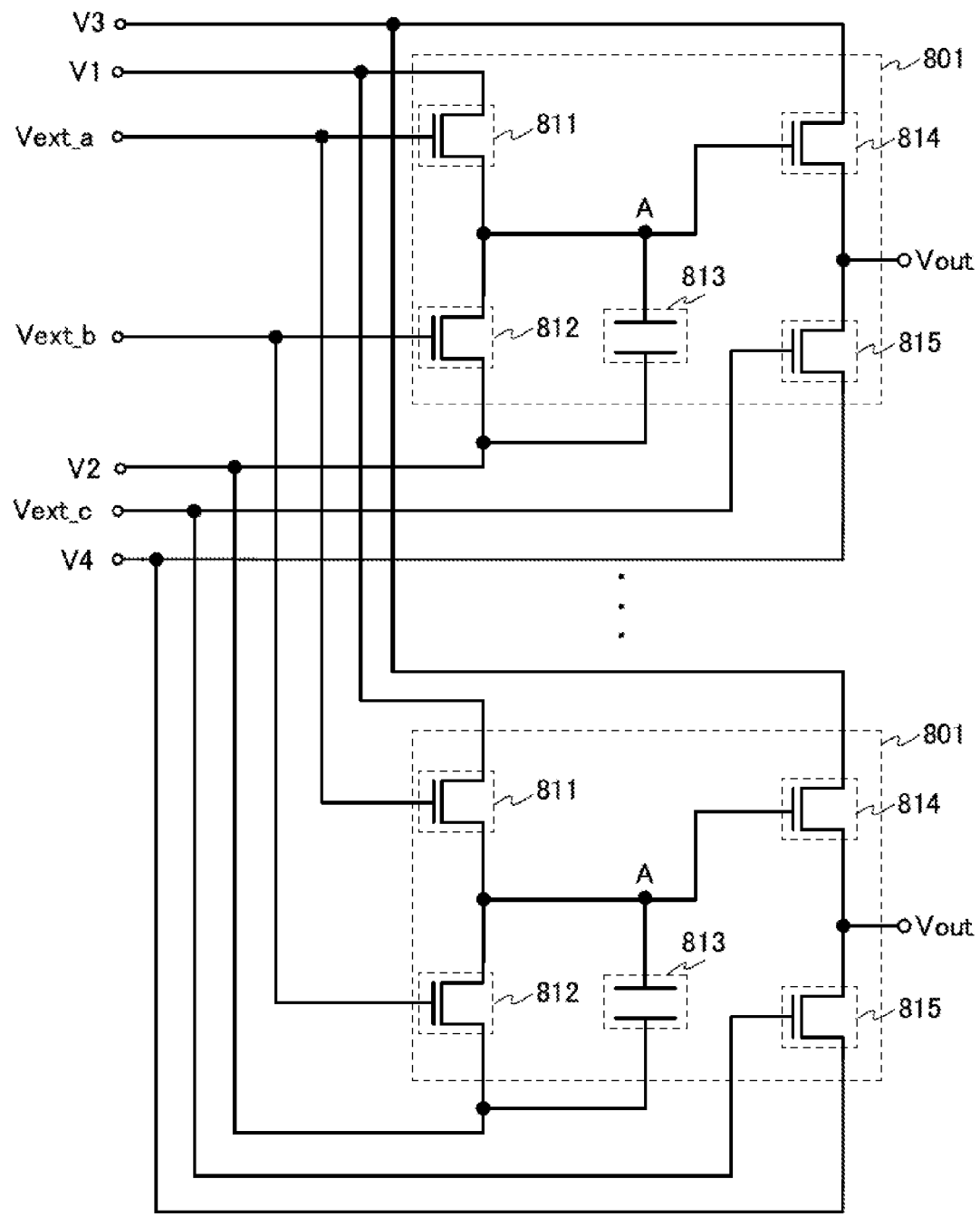
FIG. 8 is a circuit diagram of a circuit for evaluating characteristics.

First, a configuration of a circuit for evaluating characteristics used for calculation of off-state current is described. In this embodiment, a circuit for evaluating characteristics which is provided with eight measurement systems 801 connected to each other in parallel was used. Specifically, FIG. 8 illustrates two of the eight measurement systems 801 as an example.

The measurement systems 801 each includes a transistor 811, a transistor 812, a capacitor 813, a transistor 814, and a transistor 815.

The transistor 811 is for injection of electric charge. A first terminal of the transistor 811 is connected to a node to which a potential V1 is applied, and a second terminal thereof is connected to a first terminal of the transistor 812. A gate electrode of the transistor 811 is connected to a node to which a potential Vext_a is applied.

The transistor 812 is a transistor for evaluation of leakage current. Note that the leakage current in this embodiment means leakage current including an off-state current of the transistor. The first terminal of the transistor 812 is connected to the second terminal of the transistor 811, and a second terminal thereof is connected to a node to which a potential V2 is applied. A gate electrode of the transistor 812 is connected to a node to which a potential Vext_b is applied.

A first electrode of the capacitor 813 is connected to the second terminal of the transistor 811 and the first terminal of the transistor 812. A second electrode of the capacitor 813 is connected to the node to which the potential V2 is applied.

A first terminal of the transistor 814 is connected to a node to which a potential V3 is applied, and a second terminal thereof is connected to a first terminal of the transistor 815. A gate electrode of the transistor 814 is connected to the second terminal of the transistor 811, the first terminal of the transistor 812, and the first electrode of the capacitor 813. Note that a portion to which the gate electrode of the transistor 814 is connected is referred to as a node A.

The first terminal of the transistor 815 is connected to the second terminal of the transistor 814, and a second terminal thereof is connected to a node to which a potential V4 is applied. A gate electrode of the transistor 815 is connected to a node to which a potential Vext_c is applied.

The measurement system 801 outputs a potential of a node to which the second terminal of the transistor 814 and the first terminal of the transistor 815 are connected as a potential Vout of an output signal.

In this embodiment, a transistor which includes an oxide semiconductor in an active layer and includes a channel formation region which is included in the active layer and has a channel length L of 10 μm and a channel width W of 10 μm is used as the transistor 811.

Note that a channel formation region corresponds to a region of a semiconductor film, which exists between a source electrode and a drain electrode and overlaps with a gate electrode with a gate insulating film provided therebetween.

For the transistor 814 and the transistor 815, transistors which include an oxide semiconductor in an active layer and includes a channel formation region which is included in the active layer and has a channel length L of 3 μm and a channel width W of 100 μm are used.

In addition, as the transistor 812, a bottom-gate transistor which includes an oxide semiconductor in an active layer, which includes a source electrode and a drain electrode in contact with upper portions of the active layer, which does not include an overlap region where a source electrode and a drain electrode overlap with a gate electrode, and which includes an offset region having a width of 1 μm is used. Providing the offset region can reduce parasitic capacitance. As the transistor 812, transistors whose channel formation regions included in active layers have various sizes as noted in Condition 1 to Condition 6 in Table 1 are used.

TABLE 1

|  | Chanel length L [μm] | Channel width W [m] |
|---|---|---|
| Condition 1 | 1.5 | 0.1 |
| Condition 2 | 3 | 0.1 |
| Condition 3 | 10 | 0.1 |
| Condition 4 | 1.5 | 1 |
| Condition 5 | 3 | 1 |
| Condition 6 | 10 | 1 |

In the case of not providing the transistor 811 for injection of electric charge in the measurement system 801, the transistor 812 for evaluation of leakage current needs to be turned on at the time of injecting electric charge to the capacitor 813. In this case, if the transistor 812 for evaluation of leakage current is an element that requires a long time to turn into a steady off-state from an on-state, the measurement would take a long time. By separately providing the transistor 811 for injection of electric charge and a transistor 812 for evaluation of leakage current in the measurement system 801 as illustrated in FIG. 8, the transistor 812 for evaluation of leakage current can be always kept off at the time of injection of electric charge. Thus, time required for measurement can be shortened.

In addition, by separately providing the transistor 811 for injection of electric charge and the transistor 812 for evaluation of leakage current in the measurement system 801, each of these transistors can be of proper sizes. Further, by making the channel width W of the transistor 812 for evaluation of leakage current larger than that of the transistor 811 for injection of electric charge, the leakage current inside the circuit for evaluating characteristics except for the leakage current of the transistor 812 for evaluation of leakage current can be made relatively low. As a result, the leakage current of the transistor 812 for evaluation of leakage current can be measured with high accuracy. Further, since the transistor 812 for evaluation of leakage current does not need to be turned on at the time of injection of electric charge, the influence of fluctuations in the potential of the node A caused by part of the electric charge in the channel formation region flowing into the node A can be prevented.

On the other hand, by making the channel width W of the transistor 811 for injection of electric charge smaller than that of the transistor 812 for evaluation of leakage current, the leakage current of the transistor 811 for injection of electric charge can be made relatively low. Further, change in the potential of the node A, due to flow of part of the charge in the channel formation region into the node A, has little influence at the time of injection of charge.

In addition, by connecting the plurality of measurement systems 801 in parallel to each other as illustrated in FIG. 8, the leakage current of the circuit for evaluating characteristics can be calculated with higher accuracy.

Next, a specific method for calculating the off-state current of a transistor with the use of the circuit for evaluating characteristics illustrated in FIG. 8 will be described.

Figure 9:
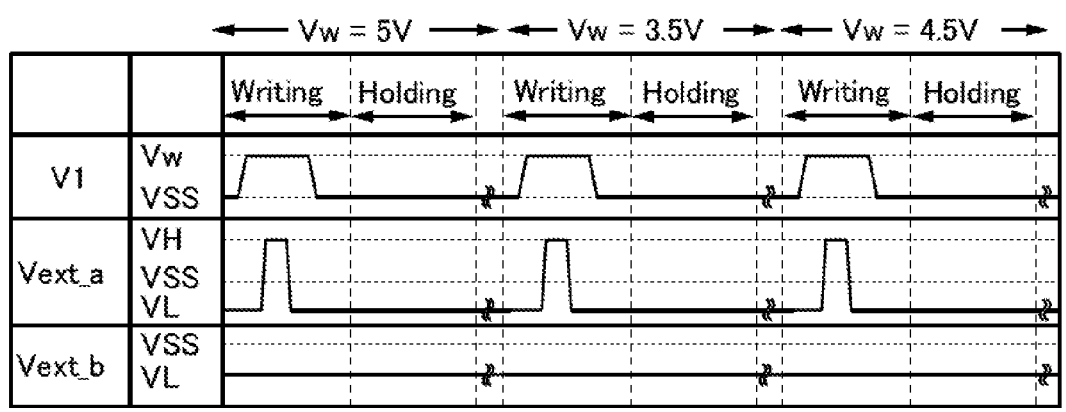
FIG. 9 is a timing chart of a circuit for evaluating characteristics.

First, a method for measuring a leakage current of the circuit for evaluating characteristics shown in FIG. 8 is described with reference to FIG. 9. FIG. 9 is a timing chart for describing the method for measuring the leakage current with use of the circuit for evaluating characteristics shown in FIG. 8.

In the measurement of the leakage current with use of the circuit for evaluating characteristics shown in FIG. 8, a writing period and the holding period are provided. Operations performed in these periods are described below. Note that in both the writing period and the holding period, it is assumed that the potential V2 and the potential V4 are 0 V, the potential V3 is 5 V, and the potential Vext_c is 0.5 V.

First, in the writing period, the potential Vext_b is set to a potential VL (−3 V) with which the transistor 812 is off. The potential V1 is set to a writing potential Vw, and then, the potential Vext_a is set to a potential VH (5 V) with which the transistor 811 is in an on state, for a certain period. In the above-described manner, electric charge is accumulated in the node A, and the potential of the node A becomes equivalent to the writing potential Vw. Then, the potential Vext_a is set to a potential VL at which the transistor 811 is off. Then, the potential V1 is set to a potential VSS (0 V).

Next, in the holding period, the amount of change in the potential of the node A, caused by a change in the amount of electric charge accumulated in the node A, is measured. From the amount of change in the potential, the value of the current flowing between the source electrode and the drain electrode of the transistor 812 can be calculated. In such a manner, accumulation of charge in the node A and measurement of the amount of change in the potential of the node A can be performed.

Accumulation of electric charge of the node A and measurement of the amount of change in the potential of the node A (also referred to as the accumulation and measurement operation) are repeatedly performed. Firstly, a first accumulation and measurement operation was repeated 15 times. In the first accumulation and measurement operation, a potential of 5 V as the writing potential Vw is input in the writing period, and held for one hour in the holding period. Next, second storage and measurement operation are repeated twice. In the second accumulation and measurement operation, a potential of 3.5 V as the writing potential Vw is input in the writing period, and held for 50 hours in the holding period. Then, third storage and measurement operation is performed once. In the third accumulation and measurement operation, a potential of 4.5 V as the writing potential Vw is input in the writing period, and held for 10 hours in the holding period. It is possible to confirm if a measured current value is a value supposed to be obtained at the steady state by repeating the storage and measurement operations. In other words, it is possible to remove a transient (a current decreasing with time after the start of the measurement) from $I_A$ (current flowing through the node A). As a result, the leakage current can be measured with greater accuracy.

In general, the potential $V_A$ denoting the potential of the node A can be expressed as a function of the potential Vout of the output signal by the following equation.

$$V_A = F(V\text{out})$$

Electric charge $Q_A$ of the node A can be expressed by the following equation with the use of the potential $V_A$ of the node A, capacitance $C_A$ connected to the node A, and a constant (const). The capacitance $C_A$ connected to the node A is the sum of the capacitance of the capacitor 813 and the capacitance other than the capacitance of the capacitor 813.

$$Q_A = C_A V_A + \text{const}$$

IA denoting current flowing through the node A is the time derivatives of charge flowing to the node A (or charge flowing from the node A), so that the current IA is expressed by the following equation.

$$I_A \equiv \frac{\Delta Q_A}{\Delta t} = \frac{C_A \, \Delta F(Vout)}{\Delta t}$$

Here, as an example, Δt is about 54000 sec. The current $I_A$ of the node A can be calculated using the capacitance $C_A$ connected to the node A and the potential Vout of the output signal, and the leakage current of the circuit for evaluating characteristics can be accordingly obtained.

Next, the measured results of the potential Vout of the output signal by the measurement method using the above circuit for evaluating characteristics are shown, and the value of the leakage current of the circuit for evaluating characteristics, which is calculated from the measurement results, is shown.

Figure 10:
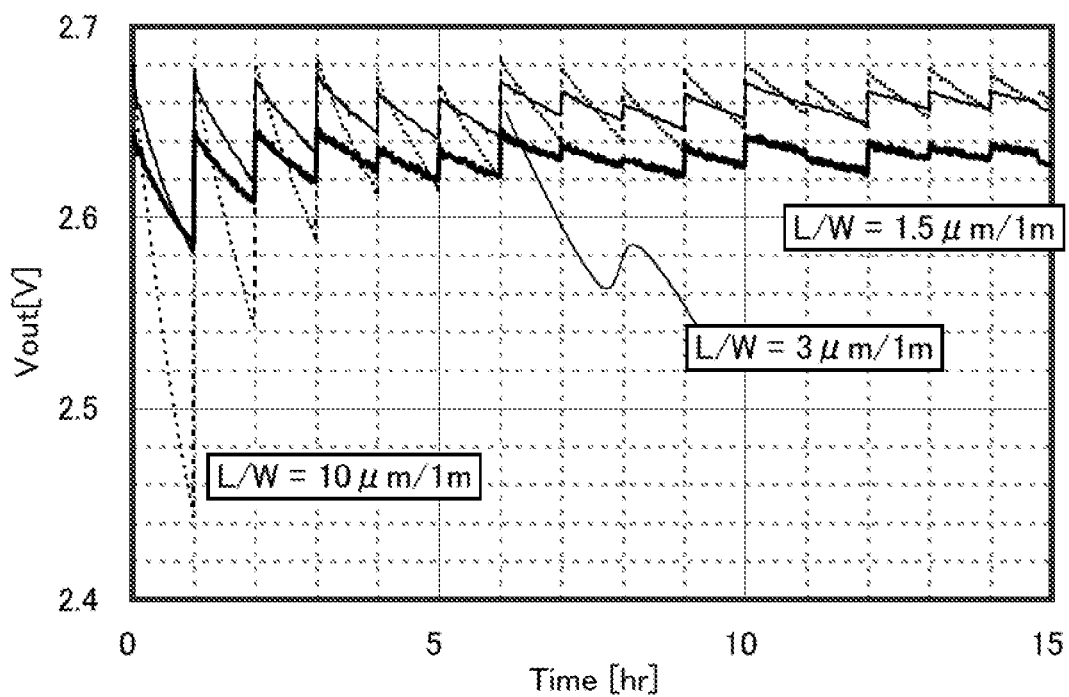
FIG. 10 shows a relation between time and a potential Vout of an output signal in a circuit for evaluating characteristics.
Figure 11:
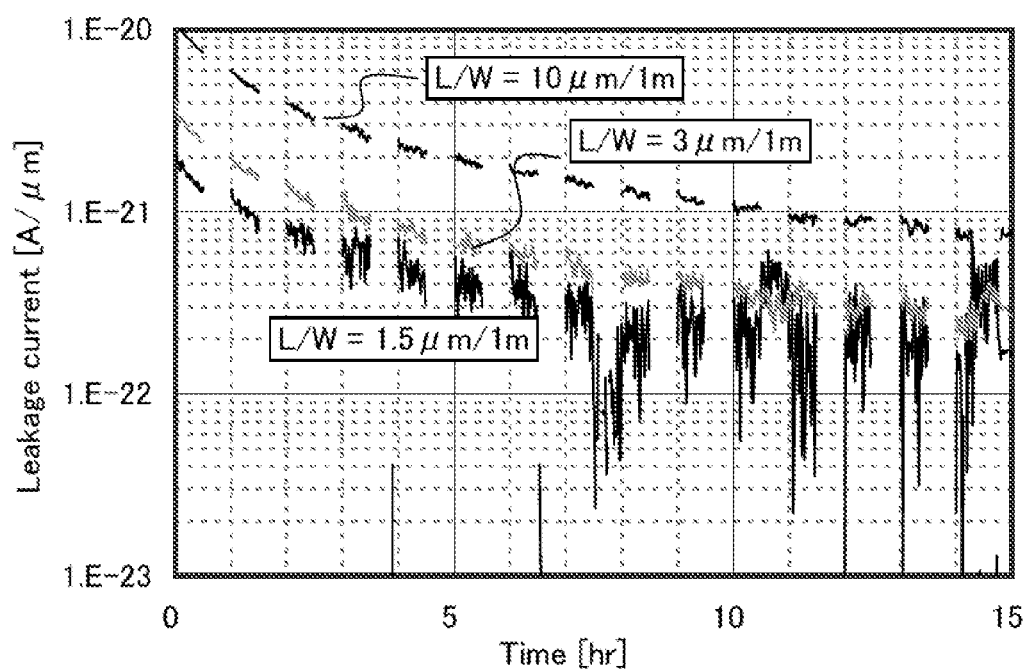
FIG. 11 shows a relation between time and a leakage current obtained by a measurement in a circuit for evaluating characteristics.

FIG. 10 shows the relation between the potential Vout of the output signal and the time in the measurement (the first accumulation and measurement operation) under Condition 1, Condition 2, and Condition 3 as examples. FIG. 11 shows the relation between the leakage current calculated by the measurement and the time in the measurement. It was found that the potential Vout of the output signal varies after the start of the measurement and time required for obtaining the steady state is 10 hours or longer.

Figure 12:
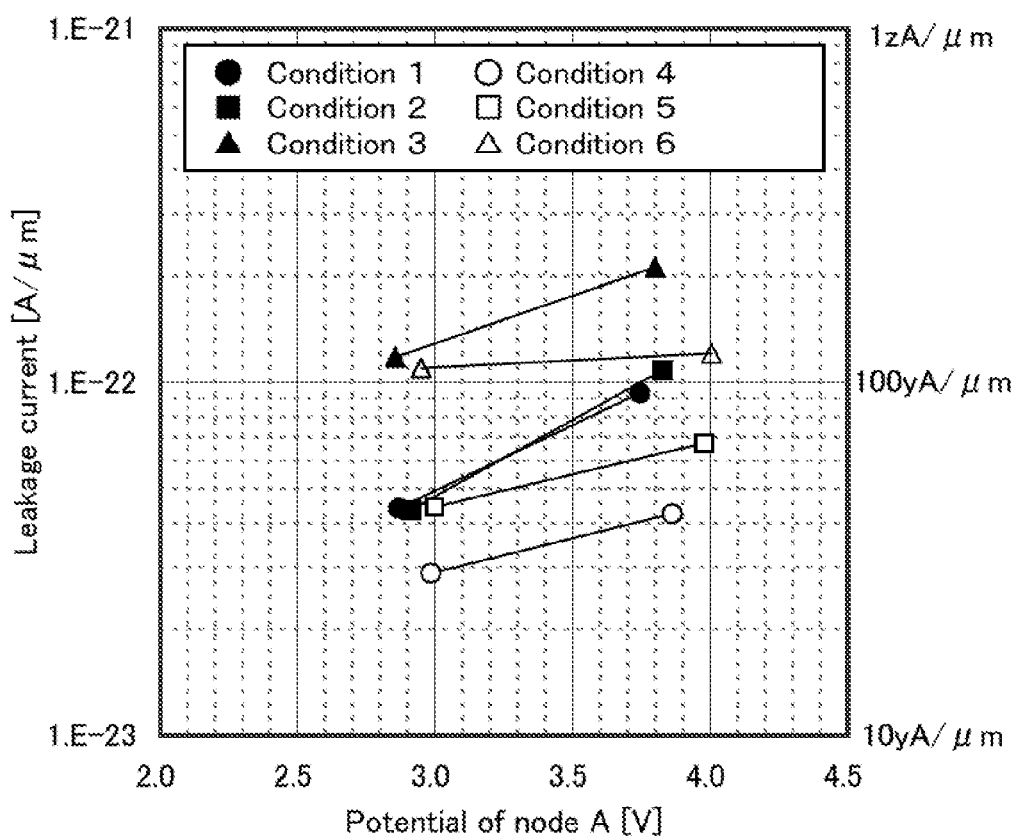
FIG. 12 shows a relation between the potential of a node A and a leakage current in a circuit for evaluating characteristics.

FIG. 12 shows the relation between the leakage current and the potential of the node A under Conditions 1 to 6 obtained from the measurement. According to FIG. 12, in Condition 4 for example, when the potential of the node A is 3.0 V, the leakage current is 28 yA/μm. Since the leakage current includes the off-state current of the transistor 812, the off-state current of the transistor 812 can be considered to be 28 yA/μm or less.

As described above, the leakage current of the circuit for evaluating characteristics using a transistor in which a highly-purified oxide semiconductor layer is included in a channel formation layer is sufficiently small, which means that the off-state current of the transistor is sufficiently small.

Embodiment 3

In this embodiment, an example of a cross-sectional structure of the memory cell 110 illustrated in FIG. 7A is described. Note that in this embodiment, the cross-sectional structure of the memory cell 110 is described using an example in which a semiconductor, such as silicon or germanium, which is amorphous, microcrystalline, or single crystal is used for an active layer of each of the transistor 163t, the transistor 164t, and the transistors 174 to 177, and an oxide semiconductor is used for an active layer of each of the transistor 167 and the transistor 168.

Note that as a silicon, any of the following can be used: amorphous silicon formed by a vapor deposition method such as a plasma CVD method, or a sputtering method; polycrystalline silicon obtained in such a manner that amorphous silicon is crystallized by treatment such as laser annealing; single crystal silicon obtained in such a manner that a surface portion of a single crystal silicon wafer is separated by implantation of hydrogen ions or the like into the silicon wafer; and the like.

Figure 13:
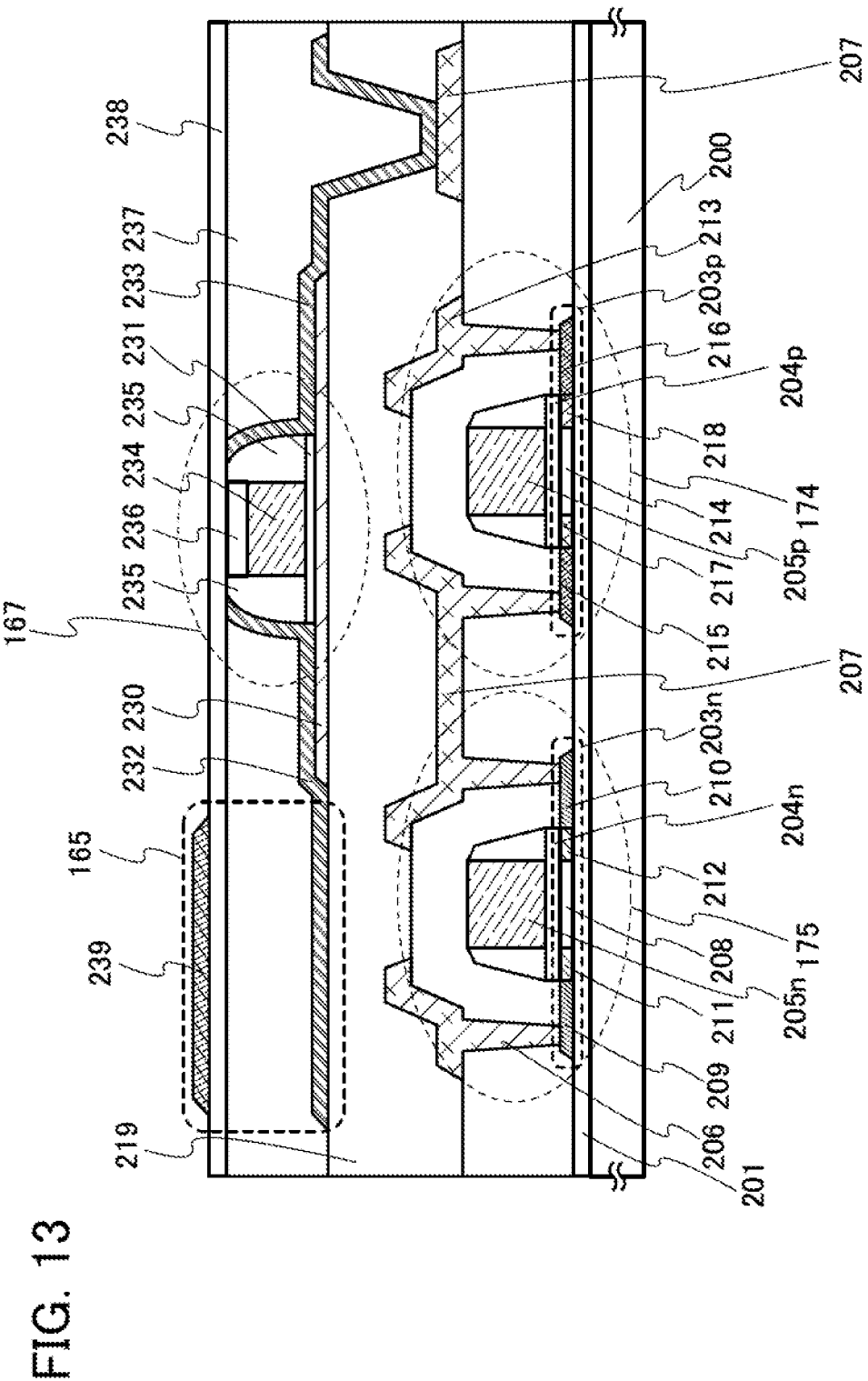
FIG. 13 is a cross-sectional view of a semiconductor device.

FIG. 13 illustrates a cross-sectional view as an example of a structure including the p-channel transistor 174, the n-channel transistor 175, the capacitor 165, and the transistor 167.

A memory device illustrated in FIG. 13 includes the transistor 175 and the transistor 174 over a substrate 200. An insulating film 201 is formed over a surface of the substrate 200.

The transistor 175 includes a semiconductor film 203n containing silicon having crystallinity, the gate insulating film 204n over the semiconductor film 203n, a gate electrode 205n overlapping the semiconductor film 203n with the gate insulating film 204n laid therebetween, and conductive films 206 and 207 which are connected to the semiconductor film 203n. The semiconductor film 203n includes a first region 208 serving as a channel formation region and second regions 209 and 210 serving as a source region and a drain region. The first region 208 is sandwiched between the second regions 209 and 210. Note that FIG. 13 illustrates the case where the semiconductor film 203n includes third regions 211 and 212 serving as lightly doped drain (LDD) regions between the first region 208 and the second region 209 and between the first region 208 and the second region 210, respectively.

The transistor 174 includes a semiconductor film 203p including silicon having crystallinity, a gate insulating film 204p over the semiconductor film 203p, a gate electrode 205p provided in a portion overlapping with the semiconductor film 203p with the gate insulating film 204p positioned therebetween, and the conductive film 207 and a conductive film 213 which are connected to the semiconductor film 203p. The semiconductor film 203p includes a first region 214 serving as a channel formation region and second regions 215 and 216 serving as a source region and a drain region. The first region 214 is sandwiched between the second regions 215 and 216. FIG. 13 illustrates an example of the case where the semiconductor film 203p includes third regions 217 and 218 serving as LDD regions between the first region 214 and the second region 215 and between the first region 214 and the second region 216.

Note that the transistor 175 and the transistor 174 share the conductive film 207 in FIG. 13.

Further, FIG. 13 illustrates the case where the transistor 175 and 174 each include a thin semiconductor film; however, the transistors 175 and 174 may each have a channel formation region in a bulk semiconductor substrate. For the thin semiconductor film, for example, polycrystalline silicon obtained by crystallization of amorphous silicon with the use of a laser, single crystal silicon obtained in such a manner that hydrogen ions or the like are implanted into a single crystal silicon wafer and a surface portion of the single crystal silicon wafer is separated, and the like can be used.

In the memory device illustrated in FIG. 13, an insulating film 219 is formed over the conductive film 206, the conductive film 207, and the conductive film 213. The transistor 167 is provided over the insulating film 219.

The transistor 167 includes a semiconductor film 230 containing an oxide semiconductor over the insulating film 219 and a gate insulating film 231 over the semiconductor film 230. Note that the gate insulating film 231 does not completely cover the semiconductor film 230. The transistor 167 includes conductive films 232 and 233 serving as a source electrode and a drain electrode over the semiconductor film 230, and the semiconductor film 230 is connected to the conductive films 232 and 233 in respective regions of the oxide semiconductor film 230 which are not covered with the gate insulating film 231.

The conductive film 233 is connected to the conductive film 207 through an opening provided in the insulating film 219.

In the transistor 167, a gate electrode 234 and sidewalls 235 are provided over the gate insulating film 231 to overlap with the semiconductor film 230. The sidewalls 235 are provided on the side surfaces of the gate electrode 234. Part of the conductive film 232 and part of the conductive film 233 are located over the sidewalls 235 to overlap therewith. An insulating film 237 is formed over the conductive films 232 and 233.

The conductive films 232 and 233 are not necessarily in contact with the sidewalls 235. However, the structure where the conductive films 232 and 233 are in contact with the sidewalls 235 can eliminate a possibility of a change in the size of the area where the conductive films 232 and 233 are in contact with the semiconductor film 230, even in the case where the conductive films 232 and 233 deviate by a certain amount from appropriate positions. Accordingly, variations in on-state current of the transistor 167 due to the position deviation of the conductive films 232 and 233 can be prevented.

An insulating film 236 is provided over the gate electrode 234. Although the insulating film 236 is not necessarily provided, in the case where the insulating film 236 is provided over the gate electrode 234, the conductive films 232 and 233 can be prevented from being in contact with the gate electrode 234 even when the conductive films 232 and 233 are misaligned to overlap with a top portion of the gate electrode 234.

An insulating film 238 is provided over the transistor 167 and the insulating film 237. A conductive film 239 is provided over the insulating film 238. A portion where the conductive films 232 and 239 overlap with each other with the insulating films 237 and 238 positioned therebetween functions as the capacitor 165.

Note that FIG. 13 illustrates the case where the capacitor 165, together with the transistor 167, is formed over the insulating film 219; however, the capacitor 165, together with the transistors 175 and 174, may be formed below the insulating film 219.

Further, in FIG. 13, the transistor 167 includes the gate electrode 234 on at least one side of the semiconductor film 230. Alternatively, the transistor 167 may include a pair of gate electrodes with the semiconductor film 230 positioned therebetween.

As one example of a semiconductor material which has a wider band gap than a silicon semiconductor and has a lower intrinsic carrier density than silicon, a compound semiconductor such as silicon carbide (SiC) or gallium nitride (GaN) can be given in addition to an oxide semiconductor. Using the oxide semiconductor has the following advantage: transistors having excellent electrical characteristics can be formed by a sputtering method or a wet process, unlike silicon carbide or gallium nitride, and can be mass-produced easily. Further, unlike silicon carbide or gallium nitride, the oxide semiconductor can be formed at room temperature, whereby transistors having excellent electrical characteristics can be formed on a glass substrate or on an integrated circuit using silicon. Further, a larger substrate can be used. Accordingly, among the semiconductors with wide band gaps, the oxide semiconductor particularly has an advantage of high volume productivity. Further, in the case where an oxide semiconductor with high crystallinity is to be obtained in order to improve the property of a transistor (e.g., field-effect mobility), the oxide semiconductor with crystallinity can be easily obtained by heat treatment at 250° C. to 800° C.

Note that a purified oxide semiconductor (purified OS) obtained by reduction of impurities such as moisture or hydrogen which serves as an electron donor (donor) and by reduction of oxygen defects is an intrinsic (i-type) semiconductor or a substantially i-type semiconductor. Therefore, a transistor including the oxide semiconductor has a characteristic of a significantly low off-state current. Furthermore, the band gap of the oxide semiconductor is 2 eV or more, preferably 2.5 eV or more, more preferably 3 eV or more. With the use of the oxide semiconductor film which is purified by sufficiently reducing the concentration of impurities such as moisture or hydrogen and by reducing oxygen defects, off-state current of the transistor can be reduced.

Specifically, various experiments can prove a low off-state current of a transistor in which a purified oxide semiconductor is used for a channel formation region. For example, even when an element has a channel width of $1 \times 10^6$ μm and a channel length of 10 μm, off-state current can be lower than or equal to the measurement limit of a semiconductor parameter analyzer, i.e., lower than or equal to $1 \times 10^{-13}$ A, at a voltage (drain voltage) between the source electrode and the drain electrode of from 1 V to 10 V. In that case, it can be seen that off-state current standardized on the channel width of the transistor is lower than or equal to 100 zA/μm. In addition, a capacitor and a transistor were connected to each other and the off-state current was measured with a circuit in which electric charge flowing into or from the capacitor is controlled by the transistor. In the measurement, a highly-purified oxide semiconductor film was used for a channel formation region of the transistor, and the off-state current of the transistor was measured from a change in the amount of electrical charge of the capacitor per unit hour. As a result, it was found that, in the case where the voltage between the source electrode and the drain electrode of the transistor is 3 V, a lower off-state current of several tens of yA/μm is obtained. Accordingly, the off-state current of the transistor in which the purified oxide semiconductor film is used as a channel formation region is considerably lower than that of a transistor in which silicon having crystallinity is used.

Note that an oxide semiconductor preferably contains at least indium (In) or zinc (Zn). In particular, In and Zn are preferably contained. As a stabilizer for reducing variation in electric characteristics of a transistor including the oxide semiconductor, gallium (Ga) is preferably additionally included. Tin (Sn) is preferably contained as a stabilizer. Hafnium (Hf) is preferably contained as a stabilizer. Aluminum (Al) is preferably contained as a stabilizer.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

As the oxide semiconductor, for example, an indium oxide, a tin oxide, a zinc oxide, a two-component metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide, a three-component metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide, a four-component metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used.

Note that for example, an "In—Ga—Zn-based oxide" means an oxide containing In, Ga, and Zn and there is no particular limitation on the ratio of In, Ga, and Zn. Further, the In—Ga—Zn-based oxide may contain a metal element other than In, Ga, and Zn. Note that an In—Ga—Zn-based oxide has sufficiently high resistance when there is no electric field and thus the off-state current can be sufficiently low. In addition, also having high mobility, the In—Ga—Zn-based oxide is suitable for a semiconductor material used in a semiconductor device.

For example, an In—Ga—Zn-based oxide with an atomic ratio of In:Ga:Zn=1:1:1 (=1/3:1/3:1/3) or In:Ga:Zn=2:2:1 (=2/5:2/5:1/5), or an oxide with an atomic ratio close to the above atomic ratios can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or an oxide with an atomic ratio close to the above atomic ratios may be used.

However, the composition is not limited to those described above, and a material having an appropriate composition may be used in accordance with necessary electrical characteristics (such as mobility, threshold voltage, and variation). In order to obtain necessary electrical characteristics, it is preferable that the carrier density, the impurity concentration, the defect density, the atomic ratio of a metal element to oxygen, the interatomic distance, the density, and the like be set to be appropriate.

For example, the oxide semiconductor film can be formed by a sputtering method using a target including indium (In), gallium (Ga), and zinc (Zn). In the case of forming an In—Ga—Zn-based oxide semiconductor film by a sputtering method, it is preferable to use a target of an In—Ga—Zn-based oxide having an atomic ratio of In:Ga:Zn=1:1:1, 4:2:3, 3:1:2, 1:1:2, 2:1:3, or 3:1:4. When an oxide semiconductor film is formed using a target of an In—Ga—Zn-based oxide having the above atomic ratio, a polycrystal or a c-axis-aligned crystal (CAAC) OS to be described later is easily formed. The filling factor of the target including In, Ga, and Zn is 90% or higher and 100% or lower, and preferably 95% or higher and lower than 100%. With the use of the target with high filling rate, a dense oxide semiconductor film is formed.

In the case where an In—Zn-based oxide material is used as an oxide semiconductor, a target of the In—Zn-based oxide has a composition ratio of In:Zn=50:1 to 1:2 in an atomic ratio ($In_2O_3$:ZnO=25:1 to 1:4 in a molar ratio), preferably In:Zn=20:1 to 1:1 in an atomic ratio ($In_2O_3$:ZnO=10:1 to 1:2 in a molar ratio), more preferably In:Zn=1.5:1 to 15:1 in an atomic ratio ($In_2O_3$:ZnO=3:4 to 15:2 in a molar ratio). For example, in a target used for formation of an oxide semiconductor film including an In—Zn-based oxide which has an atomic ratio of In:Zn:O=X:Y:Z, the relation of Z>1.5X+Y is satisfied. The mobility can be improved by keeping the ratio of Zn within the above range.

In the case of forming an In—Sn—Zn-based oxide semiconductor film as an oxide semiconductor film by a sputtering method, an In—Sn—Zn-based oxide target having the following atomic ratio of metal elements is used: the atomic ratio of In:Sn:Zn is 1:1:1, 2:1:3, 1:2:2, or 4:9:7.

Specifically, the oxide semiconductor film may be formed as follows: the substrate is held in the chamber with pressure reduced, residual moisture in the chamber is removed, a sputtering gas from which hydrogen and moisture are removed is introduced, and the above-described target is used. The substrate temperature may be higher than or equal to 100° C. and lower than or equal to 600° C., preferably higher than or equal to 200° C. and lower than or equal to 400° C. in deposition. By forming the oxide semiconductor film in a state where the substrate is heated, the concentration of impurities included in the formed oxide semiconductor film can be reduced. In addition, damage by sputtering can be reduced. In order to remove remaining moisture in the treatment chamber, an entrapment vacuum pump is preferably used. For example, a cryopump, an ion pump, or a titanium sublimation pump is preferably used. The evacuation unit may be a turbo pump provided with a cold trap. In the treatment chamber which is evacuated with the cryopump, for example, a hydrogen atom, a compound containing a hydrogen atom, such as water ($H_2O$), (more preferably, also a compound containing a carbon atom), and the like are removed, whereby the impurity concentration in the oxide semiconductor film formed in the treatment chamber can be reduced.

Note that the oxide semiconductor film formed by sputtering or the like contains a large amount of moisture or hydrogen (including a hydroxyl group) as an impurity in some cases. Moisture and hydrogen easily form a donor level and thus serve as impurities in the oxide semiconductor. Thus, in one mode of the present invention, in order to reduce impurities such as moisture or hydrogen in the oxide semiconductor film (in order to perform dehydration or dehydrogenation), the oxide semiconductor film is subjected to heat treatment in a reduced-pressure atmosphere, an inert gas atmosphere of nitrogen, a rare gas, or the like, an oxygen gas atmosphere, or ultra dry air (the moisture amount is 20 ppm (−55° C. by conversion into a dew point) or less, preferably 1 ppm or less, more preferably 10 ppb or less, in the case where measurement is performed by a dew point meter in a cavity ring down laser spectroscopy (CRDS) method).

By performing heat treatment on the oxide semiconductor film, moisture or hydrogen in the oxide semiconductor film can be lost. Specifically, heat treatment may be performed at a temperature higher than or equal to 250° C. and lower than or equal to 750° C., preferably higher than or equal to 400° C. and lower than the strain point of a substrate. For example, heat treatment may be performed at 500° C. for approximately three minutes to six minutes. When an RTA method is used for the heat treatment, dehydration or dehydrogenation can be performed in a short time; therefore, treatment can be performed even at a temperature higher than the strain point of a glass substrate.

Note that in some cases, the heat treatment makes oxygen released from the oxide semiconductor film and oxygen deficiency is formed in the oxide semiconductor film. Thus, it is preferable that treatment for supplying oxygen to the semiconductor film 230 be performed after the heat treatment, so that oxygen vacancies are reduced.

For example, by heat treatment performed in an atmosphere containing oxygen, oxygen can be supplied to the semiconductor film 230. Heat treatment for supplying oxygen may be performed under conditions similar to those of the above heat treatment for reducing the concentration of moisture or hydrogen. Note that heat treatment for supplying oxygen is performed in an atmosphere containing oxygen, such as an oxygen gas or an ultra dry air atmosphere (the moisture content is lower than or equal to 20 ppm (−55° C. by conversion into a dew point), preferably lower than or equal to 1 ppm, further preferably lower than or equal to 10 ppb, in the measurement with use of a dew point meter of a cavity ring down laser spectroscopy (CRDS) system).

It is preferable that in the gas containing oxygen, the concentration of water or hydrogen be low. Specifically, the concentration of impurities in the oxygen gas is lower than or equal to 1 ppm, preferably lower than or equal to 0.1 ppm.

Alternatively, as a method for supplying oxygen to the semiconductor film 230, an ion implantation method, an ion doping method, a plasma immersion ion implantation method, plasma treatment, or the like can be used. If a crystal part included in the semiconductor film 230 is damaged after oxygen is supplied to the semiconductor film 230, heat treatment may be performed so that the damaged crystal part is repaired.

An insulating film containing oxygen may be used as an insulating film, such as a gate insulating film, which is in contact with the oxide semiconductor film so that oxygen is supplied from the insulating film to the oxide semiconductor film. The insulating film containing oxygen is preferably made to contain oxygen in a proportion higher than that in the stoichiometric composition by heat treatment in an oxygen atmosphere, oxygen doping, or the like. Oxygen doping means addition of oxygen into a semiconductor film. In addition, "oxygen doping" includes "oxygen plasma doping" in which oxygen which is made to be plasma is added to a semiconductor film. The oxygen doping may be performed by ion implantation or ion doping. By oxygen doping treatment, an insulating film that includes a region where the proportion of oxygen is higher than that in the stoichiometric composition can be formed. Then, a heat treatment is performed after formation of the insulating film including oxygen, so that oxygen is supplied from the insulating film to the oxide semiconductor film. With the above structure, oxygen defects serving as donors can be reduced in the oxide semiconductor film and the stoichiometric composition of the oxide semiconductor included in the oxide semiconductor film can be satisfied. It is preferable that the proportion of oxygen in the oxide semiconductor film be higher than the stoichiometric proportion. As a result, the oxide semiconductor film can be made substantially i-type and variation in electrical characteristics of the transistors due to oxygen defects can be reduced; thus, electrical characteristics can be improved.

Note that the heat treatment for supplying oxygen from the insulating film to the oxide semiconductor film is performed in an atmosphere of nitrogen, ultra dry air, or a rare gas (e.g., argon or helium) preferably at a temperature higher than or equal to 200° C. and lower than or equal to 400° C., for example, a temperature higher than or equal to 250° C. and lower than or equal to 350° C. It is preferable that the water content in the gas be 20 ppm or less, preferably 1 ppm or less, further preferably 10 ppb or less.

In addition, the semiconductor film 230 can be an oxide semiconductor film which is in a single crystal state, a polycrystalline (also referred to as polycrystal) state, a microcrystalline state, an amorphous state, or the like. Preferably, a CAAC-OS (c-axis aligned crystalline oxide semiconductor) film can be used as the oxide semiconductor film.

A sputtering method may be used to form an oxide semiconductor film including a CAAC-OS film. In order to obtain a CAAC-OS film by a sputtering method, it is important to form hexagonal crystals in an initial stage of deposition of an oxide semiconductor film and to cause crystal growth from the hexagonal crystals as cores. In order to achieve this, it is preferable that the distance between the target and the substrate be made to be longer (e.g., 150 mm to 200 mm) and a substrate heating temperature be 100° C. to 500° C., more preferably 200° C. to 400° C., still preferably 250° C. to 300° C. In addition to this, the deposited oxide semiconductor film is subjected to heat treatment at a temperature higher than the substrate heating temperature in the deposition. Therefore, micro-defects in the film and defects at the interface of a stacked layer can be compensated.

The CAAC-OS film is not absolutely amorphous. The CAAC-OS film, for example, includes an oxide semiconductor with a crystal-amorphous mixed phase structure where crystal parts and amorphous parts are intermingled. Note that in most cases, the crystal part fits inside a cube whose one side is less than 100 nm. In an image obtained with a transmission electron microscope (TEM), a boundary between an amorphous part and a crystal part and a boundary between crystal parts in the CAAC-OS film are not clearly detected. Further, with the TEM, a grain boundary in the CAAC-OS film is not clearly found. Thus, in the CAAC-OS film, a reduction in electron mobility due to the grain boundary is suppressed.

In each of the crystal parts included in the CAAC-OS film, for example, a c-axis is aligned in a direction parallel to a normal vector of a surface where the CAAC-OS film is formed or a normal vector of a surface of the CAAC-OS film. Further, in each of the crystal parts, metal atoms are arranged in a triangular or hexagonal configuration when seen from the direction perpendicular to the a-b plane, and metal atoms are arranged in a layered manner or metal atoms and oxygen atoms are arranged in a layered manner when seen from the direction perpendicular to the c-axis. Note that, among crystal parts, the directions of the a-axis and the b-axis of one crystal part may be different from those of another crystal part. In this specification, a term "perpendicular" includes a range from 80° to 100°, preferably from 85° to 95°. In addition, a term "parallel" includes a range from −10° to 10°, preferably from −5° to 5°.

In the CAAC-OS film, distribution of crystal parts is not necessarily uniform. For example, in the formation process of the CAAC-OS film, in the case where crystal growth occurs from a surface side of the oxide semiconductor film, the proportion of crystal parts in the vicinity of the surface of the oxide semiconductor film is higher than that in the vicinity of the surface where the oxide semiconductor film is formed in some cases. Further, when an impurity is added to the CAAC-OS film, the crystal part in a region to which the impurity is added becomes amorphous in some cases.

Since the c-axes of the crystal parts included in the CAAC-OS film are aligned in the direction parallel to a normal vector of a surface where the CAAC-OS film is formed or a normal vector of a surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that the film deposition is accompanied with the formation of the crystal parts or followed by the formation of the crystal parts through crystallization treatment such as heat treatment. Hence, the c-axes of the crystal parts are aligned in the direction parallel to a normal vector of the surface where the CAAC-OS film is formed or a normal vector of the surface of the CAAC-OS film.

In a transistor using the CAAC-OS film, change in electric characteristics due to irradiation with visible light or ultraviolet light is small. Thus, the transistor has high reliability.

For example, the CAAC-OS film is formed by a sputtering method with a polycrystalline metal oxide target. By collision of ions with the target, a crystal region included in the target may be separated from the target along an a-b plane; in other words, a sputtered particle having a plane parallel to an a-b plane (flat-plate-like sputtered particle or pellet-like sputtered particle) may flake off from the target. In that case, the flat-plate-like sputtered particle reaches a substrate while maintaining their crystal state, whereby the CAAC-OS film can be formed.

For the deposition of the CAAC-OS film, the following conditions are preferably used.

By reducing the amount of impurities entering the CAAC-OS film during the deposition, the crystal state can be prevented from being broken by the impurities. For example, the concentration of impurities (e.g., hydrogen, water, carbon dioxide, or nitrogen) which exist in the treatment chamber may be reduced. Furthermore, the concentration of impurities in a deposition gas may be reduced. Specifically, a deposition gas whose dew point is −80° C. or lower, preferably −100° C. or lower is used.

By increasing the substrate heating temperature during the deposition, migration of a sputtered particle is likely to occur after the sputtered particle reaches a substrate surface. Specifically, the substrate heating temperature during the deposition is higher than or equal to 100° C. and lower than or equal to 740° C., preferably higher than or equal to 200° C. and lower than or equal to 500° C. By increasing the substrate heating temperature during the deposition, when the flat-plate-like sputtered particle reaches the substrate, migration occurs on the substrate surface, so that a flat plane of the flat-plate-like sputtered particle is attached to the substrate.

Furthermore, it is preferable that the proportion of oxygen in the deposition gas be increased and the power be optimized in order to reduce plasma damage at the deposition. The proportion of oxygen in the deposition gas is 30 vol % or higher, preferably 100 vol %.

As an example of the target, an In—Ga—Zn-based oxide target is described below.

The In—Ga—Zn-based oxide target, which is polycrystalline, is made by mixing $InO_X$ powder, $GaO_Y$ powder, and $ZnO_Z$ powder in a predetermined molar ratio, applying pressure, and performing heat treatment at a temperature higher than or equal to 1000° C. and lower than or equal to 1500° C. Note that X, Y, and Z are each a given positive number. Here, the predetermined molar ratio of $InO_X$ powder to $GaO_Y$ powder and $ZnO_Z$ powder is, for example, 2:2:1, 8:4:3, 3:1:1, 1:1:1, 4:2:3, or 3:1:2. The kinds of powder and the molar ratio for mixing powder may be determined as appropriate depending on the desired target.

This embodiment can be combined with any of the other embodiments as appropriate.

Embodiment 4

A semiconductor device according to one embodiment of the present invention can be applied to display devices, personal computers, and image reproducing devices provided with recording media (typically devices which reproduce the content of recording media such as DVDs (digital versatile discs) and have displays for displaying the reproduced images). Further, as electronic appliances which can include the semiconductor device according to one embodiment of the present invention, mobile phones, portable game consoles, personal digital assistants, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATM), vending machines, and the like can be given. Specific examples of these electronic devices are illustrated in FIGS. 14A to 14C.

Figure 14A:
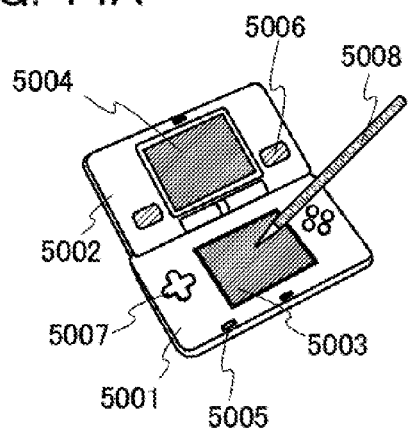
FIGS. 14A to 14F each illustrate an electronic appliance.

FIG. 14A illustrates a portable game console, which includes a housing 5001, a housing 5002, a display portion 5003, a display portion 5004, a microphone 5005, speakers 5006, an operation key 5007, a stylus 5008, and the like. Although the portable game console in FIG. 14A has the two display portions 5003 and 5004, the number of display portions included in a portable game console is not limited to this.

Figure 14B:
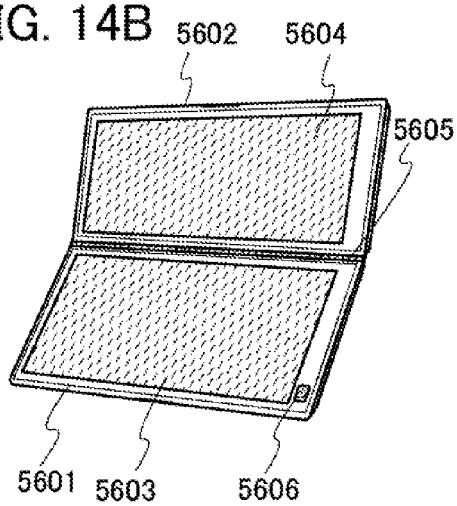

FIG. 14B illustrates a personal digital assistant, which includes a first housing 5601, a second housing 5602, a first display portion 5603, a second display portion 5604, a joint 5605, an operation key 5606, and the like. The first display portion 5603 is provided in the first housing 5601, and the second display portion 5604 is provided in the second housing 5602. The first housing 5601 and the second housing 5602 are connected to each other with the joint 5605, and an angle between the first housing 5601 and the second housing 5602 can be changed with the joint 5605. An image on the first display portion 5603 may be switched depending on the angle between the first housing 5601 and the second housing 5602 at the joint 5605. A display device with a position input function may be used as at least one of the first display portion 5603 and the second display portion 5604. Note that the position input function can be added by provision of a touch panel in a display device. Alternatively, the position input function can be added by provision of a photoelectric conversion element called a photosensor in a pixel area of a display device.

Figure 14C:
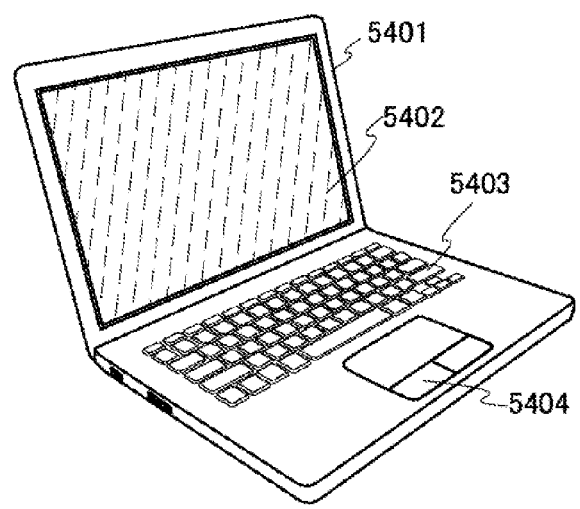

FIG. 14C illustrates a laptop personal computer, which includes a housing 5401, a display portion 5402, a keyboard 5403, a pointing device 5404, and the like.

Figure 14D:
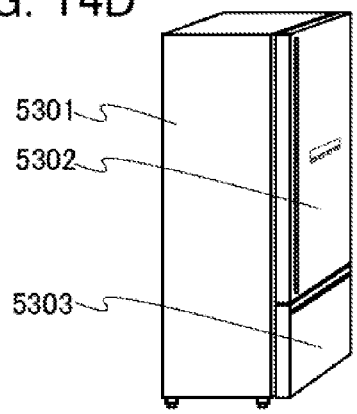

FIG. 14D illustrates the electric refrigerator-freezer including a housing 5301, a door for a refrigerator 5302, a door for a freezer 5303, and the like.

Figure 14E:
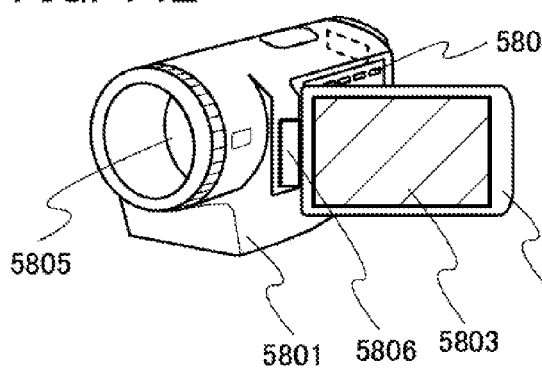

FIG. 14E illustrates a video camera, which includes a first housing 5801, a second housing 5802, a display portion 5803, operation keys 5804, a lens 5805, a joint 5806, and the like. The operation keys 5804 and the lens 5805 are provided for the first housing 5801, and the display portion 5803 is provided for the second housing 5802. The first housing 5801 and the second housing 5802 are connected to each other with the joint 5806, and the angle between the first housing 5801 and the second housing 5802 can be changed by the joint 5806. The image displayed on the display portion 5803 may be switched depending on the angle in the joint 5806 between the first housing 5801 and the second housing 5802.

Figure 14F:
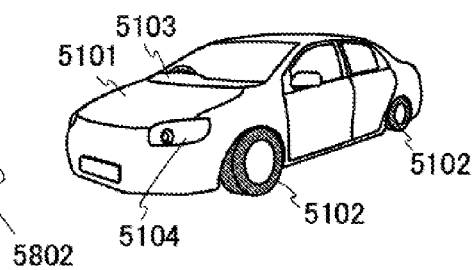

FIG. 14F illustrates an ordinary motor vehicle including a car body 5101, wheels 5102, a dashboard 5103, lights 5104, and the like.

This embodiment can be combined with any of the other embodiments as appropriate.

This application is based on Japanese Patent Application serial no. 2012-045194 filed with Japan Patent Office on Mar. 1, 2012, the entire contents of which are hereby incorporated by reference.

What is claimed is:
1. A semiconductor device comprising:
   a memory device comprising a first block, a second block, a first decoder being electrically connected to the first block, and a second decoder being electrically connected to the second block, the first block and the second block each including at least one row of memory cells;
   a cache configured to temporarily store data from the first block;

a first switch between the first block and a first power supply line, and configured to control supply of a power supply voltage to the first block;
a second switch between the second block and a second power supply line, and configured to control supply of the power supply voltage to the second block;
a third switch between the first decoder and a third power supply line;
a fourth switch between the second decoder and a fourth power supply line; and
a power controller configured to turn off the second switch to stop supply of the power supply voltage to the second block,
wherein each of the memory cells comprises:
a first transistor, a channel formation region of the first transistor comprising an oxide semiconductor layer; and
a second transistor, a channel formation region of the second transistor comprising a silicon, and
wherein the first transistor is provided over the second transistor with an insulating film provided therebetween.

2. The semiconductor device according to the claim 1, further comprising a memory management unit,
wherein the memory management unit is configured to recognize an address of the first block.

3. The semiconductor device according to the claim 1, further comprising a central processing unit core,
wherein the central processing unit core is configured to select the first block.

4. The semiconductor device according to claim 1, wherein each of the memory cells further comprises:
a first logic element comprising an input terminal and an output terminal;
a second logic element comprising an input terminal and an output terminal;
a first memory circuit electrically connected to the input terminal of the first logic element; and
a second memory circuit electrically connected to the input terminal of the second logic element,
wherein one of the first memory circuit and the second memory circuit comprises the first transistor.

5. The semiconductor device according to claim 4, wherein each of the memory cells further comprises:
a first wiring;
a second wiring;
a fifth switch configured to control electrical connection between the input terminal of the first logic element and the first wiring; and
a sixth switch configured to control electrical connection between the input terminal of the second logic element and the second wiring,
wherein the output terminal of the second logic element is electrically connected to the input terminal of the first logic element, and
wherein the output terminal of the first logic element is electrically connected to the input terminal of the second logic element.

6. The semiconductor device according to claim 4,
wherein the first memory circuit comprises a first capacitor, and
wherein the second memory circuit comprises a second capacitor.

7. The semiconductor device according to claim 1, wherein the oxide semiconductor layer has a wider band gap than silicon and a lower intrinsic carrier density than silicon.

8. The semiconductor device according to the claim 1, wherein an off current per micrometer of a channel width of the first transistor is lower than or equal to 100 zA/μm.

9. A semiconductor device comprising:
a central processing unit core;
a memory device comprising a first block, a second block, a first decoder being electrically connected to the first block, and a second decoder being electrically connected to the second block, the first block and the second block each including at least one row of memory cells;
a cache configured to temporarily store data from the first block selected by the central processing unit core;
a first switch between the first block and a first power supply line;
a second switch between the second block and a second power supply line;
a third switch between the first decoder and a third power supply line;
a fourth switch between the second decoder and a fourth power supply line;
a memory management unit configured to recognize an address of the first block and select the second block using the address; and
a power controller configured to turn off the second switch to stop supply of a power supply voltage to the second block,
wherein each of the memory cells comprises:
a first transistor, a channel formation region of the first transistor comprising an oxide semiconductor layer; and
a second transistor and a third transistor, a channel formation region of each of the second transistor and the third transistor comprising a silicon, and a conductive type of the second transistor being different from a conductive type of the third transistor, and
wherein the first transistor is provided over the second transistor and the third transistor with an insulating film provided therebetween.

10. The semiconductor device according to claim 9, wherein the oxide semiconductor layer has a wider band gap than silicon and a lower intrinsic carrier density than silicon.

11. The semiconductor device according to the claim 9, wherein an off current per micrometer of a channel width of the first transistor is lower than or equal to 100 zA/μm.

12. The semiconductor device according to the claim 9, wherein the central processing unit core has functions of a control unit, an arithmetic unit, and a register.

13. The semiconductor device according to the claim 9,
wherein each of the memory cells further comprises a logic element, and
wherein the logic element comprises the second transistor and the third transistor.

14. A semiconductor device comprising:
a central processing unit core;
a memory device comprising a first block, a second block, a first decoder being electrically connected to the first block, and a second decoder being electrically connected to the second block, the first block and the second block each including at least one row of memory cells;
a cache configured to temporarily store data from the first block selected by the central processing unit core;
a first switch between the first block and a first power supply line;
a second switch between the second block and a second power supply line;
a third switch between the first decoder and a third power supply line;

a fourth switch between the second decoder and a fourth power supply line;

a memory management unit configured to recognize an address of the first block and select the second block using the address; and a power controller configured to turn off the second switch to stop supply of a power supply voltage to the second block, and turn off the fourth switch to stop supply of the power supply voltage to the second decoder, wherein each of the memory cells comprises:
 a first transistor, a channel formation region of the first transistor comprising an oxide semiconductor layer; and
 a second transistor and a third transistor, a channel formation region of each of the second transistor and the third transistor comprising a silicon, and a conductive type of the second transistor being different from a conductive type of the third transistor, wherein the first transistor is provided over the second transistor and the third transistor with an insulating film and a conductive film provided therebetween, and wherein one of a source and a drain of each of the first transistor, the second transistor, and the third transistor is electrically connected to the conductive film.

15. The semiconductor device according to claim 14, wherein each of the first decoder and the second decoder is a row decoder.

16. The semiconductor device according to claim 14, wherein the oxide semiconductor layer has a wider band gap than silicon and a lower intrinsic carrier density than silicon.

17. The semiconductor device according to the claim 14, wherein an off current per micrometer of a channel width of the first transistor is lower than or equal to 100 zA/μm.

18. The semiconductor device according to the claim 14, wherein the central processing unit core has functions of a control unit, an arithmetic unit, and a register.

19. The semiconductor device according to the claim 14,
 wherein each of the memory cells further comprises a logic element, and
 wherein the logic element comprises the second transistor and the third transistor.

* * * * *